(12) United States Patent
Alsina et al.

(10) Patent No.: US 11,303,686 B2
(45) Date of Patent: Apr. 12, 2022

(54) ALARMS FOR A SYSTEM OF SMART MEDIA PLAYBACK DEVICES

(71) Applicant: Apple Inc., Cupertino, CA (US)

(72) Inventors: Thomas M. Alsina, Cupertino, CA (US); David C. Graham, Campbell, CA (US); Andrew M. Wadycki, Santa Clara, CA (US); Edward T. Schmidt, Santa Clara, CA (US); Joel M. Lopes Da Silva, San Francisco, CA (US); Richard M. Powell, Mountain View, CA (US); Gregory R. Chapman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/067,113

(22) Filed: Oct. 9, 2020

(65) Prior Publication Data
US 2021/0029184 A1 Jan. 28, 2021

Related U.S. Application Data

(62) Division of application No. 15/836,638, filed on Dec. 8, 2017, now Pat. No. 10,805,370.

(Continued)

(51) Int. Cl.
*H04L 29/06* (2006.01)
*H04N 21/436* (2011.01)
(Continued)

(52) U.S. Cl.
CPC ............... *H04L 65/60* (2013.01); *G08B 3/10* (2013.01); *H04L 12/2803* (2013.01);
(Continued)

(58) Field of Classification Search
CPC . H04L 65/60; H04L 65/4084; H04L 12/2803; H04L 67/32; H04L 67/306;
(Continued)

(56) References Cited

U.S. PATENT DOCUMENTS

2014/0181202 A1* 6/2014 Gossain ............. H04L 65/4076
709/204
2014/0331133 A1* 11/2014 Coburn, IV ....... H04N 21/2541
715/716

(Continued)

OTHER PUBLICATIONS

PCT/US2018/024802 International Search Report and Written Opinion, dated Oct. 2, 2018, 22 pgs.

*Primary Examiner* — Minh Chau Nguyen
(74) *Attorney, Agent, or Firm* — Morgan, Lewis & Bockius LLP

(57) ABSTRACT

One embodiment provides for a data processing system comprising a memory device to store instructions and one or more processors to execute the instructions stored on the memory device. The instructions cause the one or more processors to provide a virtual assistant to receive voice input at a media playback device associated with the data processing system. The virtual assistant, via the one or more processors, is configured to receive a voice command at the media playback device, where the voice command is to schedule an event, then determine a user account associated with the voice command, a type of command based on context information associated with the voice command, and a target device to which media playback associated with the event is to be scheduled.

20 Claims, 14 Drawing Sheets

Related U.S. Application Data

(60) Provisional application No. 62/514,651, filed on Jun. 2, 2017.

(51) Int. Cl.

| | | |
|---|---|---|
| *H04N 21/458* | (2011.01) | |
| *H04N 21/45* | (2011.01) | |
| *H04N 21/41* | (2011.01) | |
| *H04L 12/28* | (2006.01) | |
| *H04N 21/482* | (2011.01) | |
| *H04L 29/08* | (2006.01) | |
| *H04L 65/60* | (2022.01) | |
| *H04L 65/612* | (2022.01) | |
| *G08B 3/10* | (2006.01) | |
| *H04L 67/60* | (2022.01) | |
| *H04N 21/2387* | (2011.01) | |
| *H04N 21/262* | (2011.01) | |
| *H04N 21/472* | (2011.01) | |
| *H04N 21/488* | (2011.01) | |
| *H04L 67/306* | (2022.01) | |

(52) U.S. Cl.
CPC .......... *H04L 65/4084* (2013.01); *H04L 67/32* (2013.01); *H04N 21/2387* (2013.01); *H04N 21/262* (2013.01); *H04N 21/4122* (2013.01); *H04N 21/43615* (2013.01); *H04N 21/458* (2013.01); *H04N 21/4524* (2013.01); *H04N 21/4532* (2013.01); *H04N 21/47217* (2013.01); *H04N 21/488* (2013.01); *H04N 21/4825* (2013.01); *H04L 67/306* (2013.01)

(58) Field of Classification Search
CPC ............. H04N 21/2387; H04N 21/262; H04N 21/4122; H04N 21/4524; H04N 21/4532; H04N 21/458

See application file for complete search history.

(56) References Cited

U.S. PATENT DOCUMENTS

| | | | |
|---|---|---|---|
| 2014/0336803 | A1 | 11/2014 | Haverstock et al. |
| 2014/0375819 | A1* | 12/2014 | Larsen ................ G08B 13/196 348/159 |
| 2015/0171973 | A1* | 6/2015 | Luna .................... G06F 3/0202 367/197 |
| 2015/0339096 | A1 | 11/2015 | Lakshminarayanan |
| 2015/0355879 | A1* | 12/2015 | Beckhardt ............... G06F 21/44 700/94 |
| 2017/0090859 | A1 | 3/2017 | Hoadley et al. |
| 2017/0115953 | A1 | 4/2017 | Alders |

\* cited by examiner

ALARMS FOR A SYSTEM OF SMART MEDIA PLAYBACK DEVICES

CROSS-REFERENCE

This application is a divisional of co-pending U.S. application Ser. No. 15/836,638, filed Dec. 8, 2017, which claims the benefit of U.S. Provisional Patent Application No. 62/514,651 filed Jun. 2, 2017, which is hereby incorporated herein by reference.

BACKGROUND OF THE DISCLOSURE

Computing devices can be used to play and manage media items. Existing computing devices can play media that is stored on the local computing device, within a local media server or from a remote or cloud-based media service. Media playback systems can be configured to allow a user to stream media from a computing device to one or more playback devices, such as a networked speaker, Bluetooth speaker, smart television, set-top-box, or other computer devices. However, during media playback on a media playback system, incoming audio events may disrupt media that is playing during the audio event.

SUMMARY OF THE DESCRIPTION

Embodiments described herein provide a media playback system that enables a smooth transition between incoming audio events, such as pre-set alarms, and currently playing media.

One embodiment provides for a media playback device comprising a memory device to store instructions, one or more processors to execute the instructions stored on the memory device, the instructions to cause the one or more processors to provide a playback queue manager to manage one or more media playback queues including a set of media items associated with a scheduled event and a playback routing manager to determine an output destination for the set of media items based on context associated with the scheduled event, the playback routing manager to route output of playback of the set of media items to one or more of multiple different connected media playback devices based on the context associated with the scheduled event.

One embodiment provides for a non-transitory, machine-readable medium storing instructions to cause one or more processors of an electronic device to perform operations including receiving a request to play a queue of media item associated with a scheduled event; determining whether an existing playback queue is in effect on the electronic device; determining whether the queue of media items associated with the scheduled event is a transient queue; storing the existing playback queue as a secondary media queue in response to determining that the existing playback queue is in effect and that the queue of media items associated with the scheduled event is a transient queue; and playing the queue of media items associated with the scheduled event until the scheduled event is dismissed.

One embodiment provides for a data processing system comprising a memory device to store instructions; one or more processors to execute the instructions stored on the memory device, the instructions to cause the one or more processors to provide a virtual assistant to receive voice input at a media playback device associated with the data processing system, the virtual assistant, via the one or more processors, to receive a voice command at the media playback device, the voice command to schedule an event; determine a user account associated with the voice command; determine a type of command based on context information associated with the voice command; and determine a target device to which media playback associated with the event is to be scheduled.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which.

DETAILED DESCRIPTION

Embodiments described herein provide a media playback system that enables a smooth transition between incoming audio events, such as pre-set alarms, and currently playing media. Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1, while an element having a reference number between 200 and 299 is first shown in FIG. 2, etc. Within a description of a given figure, previously introduced elements may or may not be referenced.

The processes and operations depicted in the figures that follow can be performed via processing logic that includes hardware (e.g. circuitry, dedicated logic, etc.), software (as instructions on a non-transitory machine-readable storage medium), or a combination of both hardware and software. Although some of the processes are described below in terms of sequential operations, it should be appreciated that some of the operations described may be performed in a different order. Moreover, some operations may be performed in parallel rather than sequentially. Additionally, some operations may be indicated as optional and are not performed by all embodiments.

Connected Media Playback System

Figure 1:
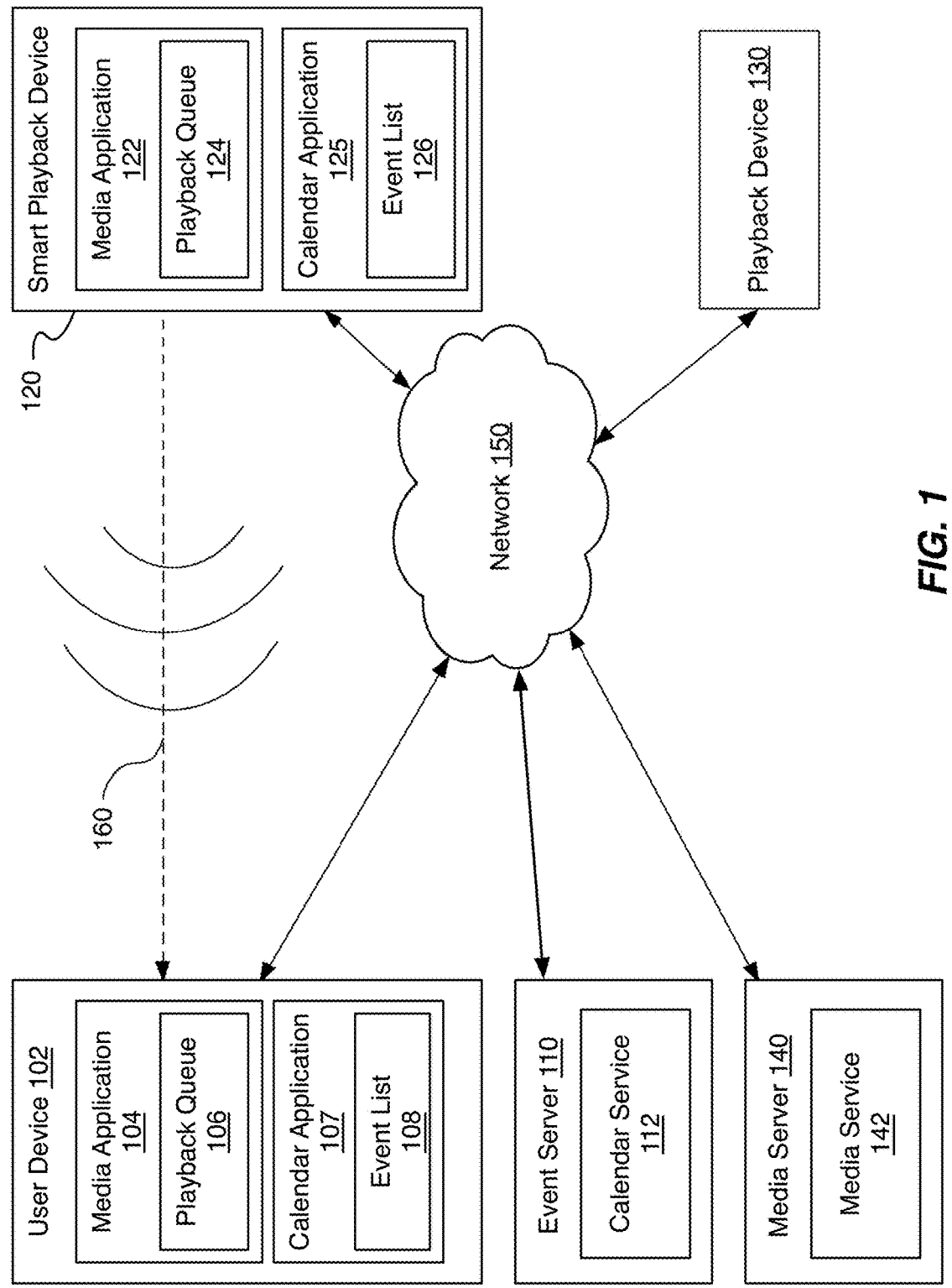
FIG. 1 is a block diagram of an exemplary connected media playback system, according to an embodiment.

FIG. 1 is a block diagram of an exemplary connected media playback system 100, according to an embodiment. The connected media playback system 100 can be configured to receive playback queues from a user device to one or more playback devices, such that the playback devices can play and optionally manage playback of media items identified within the playback queue. In one embodiment, the connected media playback system 100 can be configured to delegate media account credentials associated with a first user's device to a second user's device so that the second user's device can play back media items associated with the first user's media account. In some implementations, the connected media playback system 100 can include one or more user devices, such as user device 102. The user device 102 can be a computing device such as a smartphone, laptop computer, tablet computer, smart watch, or any other computing device.

In some implementations, the user device 102 can include a media application 104 to manage media items (e.g., music tracks, playlists, albums, movies, television shows, radio talk shows, audio books, podcasts, etc.) on the user device 102. In some implementations, the media application 104 can be a client application of a network media service. For example, the media application 104 can be configured with a user's media service account credentials for accessing the media service 142 on a media server 140. The user credentials can include, for example, an account identifier (e.g., user name, phone number, device identifier, account token, etc.) and a shared secret (e.g., password, encryption key, secret token, fingerprint data, etc.). The media service 142 can provide cloud storage for the user's media items and can provide on demand access to media items, Internet radio, and/or other types of media. A user can interact with various graphical user interfaces of the media application 104 to access media items through a network 150 (e.g., a local area network, wide area network, Wi-Fi network, cellular network, the Internet, etc.). For example, the user can generate a playlist of media items for playback, where the playlist may reference media items provided by the media service 142. When the user wishes to play back the playlist, the media application 104 can load the playlist into a playback queue 106 within memory of the user device 102. The media application 104 can then play the media items in playback queue 106 using the display and/or speakers of the user device 102.

In some implementations, the user device 102 can stream a media item to a playback device. For example, while playing a media item in playback queue 106, media application 104 can send the audio and/or video associated with the playing media item to a playback device 130. For example, the playback device 130 can be a Wi-Fi speaker, a Bluetooth speaker, a streaming media device (e.g., set-top-box), a smart television, or any other device capable of receiving and/or presenting audio and/or video data sent by user device 102. In this instance, the media application 104 can play back media items received from the media service 142, although the playback queue being played (e.g., playback queue 106) resides on the user device 102. The media application 104 can send audio and/or video data to playback device 130 for presentation through the speakers and/or display of playback device 130. However, if the user device 102 is moved out of range of the playback device 130, such that the user device 102 loses the connection to playback device 130, the playback device 130 will no longer receive the audio and/or video data. Accordingly, the playback device 130 may stop playing the audio and/or video associated with the media items in playback queue 106.

The connected media playback system 100 provided by embodiments described herein can additionally include one or more smart media playback devices (e.g., smart playback device 120). The smart playback device 120 can be a Wi-Fi speaker, a Bluetooth speaker, an in-car entertainment system, a streaming media device (e.g., set-top-box), a smart television, or any other device capable of receiving, managing, and playing a playback queue. Like the user device 102, the smart playback device 120 can be configured with a processing system capable of executing applications, including a media application 122. The media application 122 within the smart playback device 120 can have the same or similar capabilities and/or features as the media application 104 of the user device 102. For example, the media application 122 can include a playback queue 124 that includes information about media items currently being played by the media application 122. In some instances, the playback queue 124 can identify media items provided by the media service 142 on the media server 140. The smart playback device 120 can be configured with a user's media account credentials for accessing the media service 142 so that the media application 122 can obtain media items identified in playback queue 124 from media service 142 through the network 150.

In some implementations, the user device 102 can send a playback queue 106 to smart playback device 120. For example, the user device 102 can receive a wireless signal 160 (e.g., Bluetooth, Wi-Fi, etc.) broadcast from the smart playback device 120. The smart playback device 120 can periodically broadcast the wireless signal 160 so that other the user device 102 can find and connect to the smart playback device 120. The user device 102 can determine, based on the strength of the wireless signal 160, that the user device 102 is within a threshold distance of (e.g., proximate to) the smart playback device 120. In some implementations, in response to determining that user device 102 is proximate to smart playback device 120, the user device 102 can present a graphical user interface that a user can interact with to initiate a transfer of a media device playback queues between user device 102 and the smart playback device 120. In some implementations, in response to determining that user device 102 is proximate to smart playback device 120 and that user device 102 is in a resting position (e.g., on a table, horizontal, not moving, etc.), the user device 102 can automatically initiate a transfer of playback queue 106 to smart playback device 120.

In addition to the exchange of media playback queues, the user device 102 and the smart playback device 120 can exchange other information, such as to-do lists, reminders, calendar events, and alarms. In one embodiment, the smart playback device 120 can receive events from the user device 102 or via an event server 110 that provides a calendar service 112. The event server 110 can be any type of server, such as a single physical server, a virtual server, or a cluster of physical or virtual servers, including a cloud-based server. The calendar service 112 can enable the synchronization of calendar events, tasks, reminders, and alarms between various devices connected via the network 150, including the user device 102 and the smart playback device 120. The media server 140 and the event server 110 can be part of a common cloud-based server infrastructure. The calendar service 112 and the media service 142 may be associated with the same account and can be accessible using the same credentials.

The user device 102 and the smart playback device 120 can each execute applications that communicate with the calendar service 112 on the event server 110. The user device 102 can execute a calendar application 107, or a similar application having an associated event list 108. The smart playback device 120 can execute a calendar application 125 having an event list 126 that may be synchronized with the event list 108 on the user device 102 via the event server 110. Synchronization of the event lists 108, 126 enable the user device 102 and the smart playback device 120 to have a consistent view of the tasks, events, meetings, reminders, alarms, or other items for which the occurrence or impending occurrence the user may wish to be notified. While a calendar application 107 is illustrated, events, meetings, reminders, alarms, or other alerts, alarms, and timers may be generated by or associated with various applications.

In addition to data exchange via media applications 104, 122 or calendar applications 107, 125 the user device 102 and the smart playback device 120 can each support a virtual assistant that enables voice control of media playback and event scheduling. The user can direct the voice assistant on either the user device 102 or the smart playback device 120 to start or stop media playback or to schedule an event. The media playback or scheduled event can be directed towards the user device 102 or the smart playback device 120 using voice commands to the virtual assistant that is active in either device. The appropriate commands to facilitate such operations may be relayed over the network 150 to the intended target device.

Figure 2:
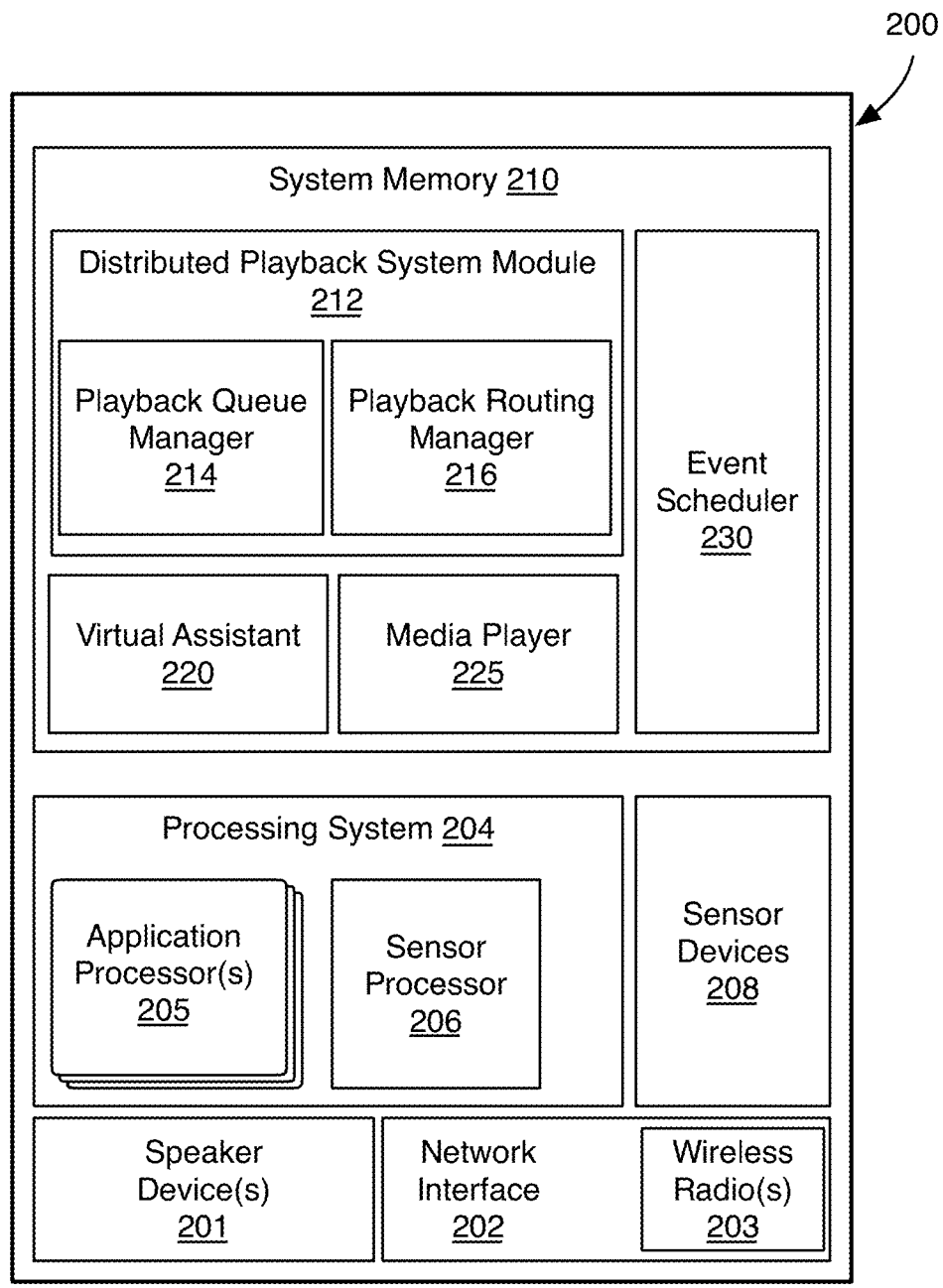
FIG. 2 is a block diagram of a computing device for use within one embodiment of a distributed media playback system.

FIG. 2 is a block diagram of a computing device 200 for use within one embodiment of a distributed media playback system. In one embodiment, the computing device 200 includes hardware and software that may be suitable for use within a user device or a smart playback device, such as the user device 102 and/or the smart playback device 120 as in FIG. 1. The computing device 200 includes one or more speaker device(s) 201 to enable media playback. Where the computing device 200 is implemented as a smart playback device, the speaker device(s) 201 may be of higher quality relative to when the computing device is implemented as a user device.

The computing device 200 also includes a network interface 202 that enables network communication functionality. The network interface 202 can couple with one or more wireless radio(s) 203 to enable wireless communication over one or more wireless networking technologies such as, but not limited to Wi-Fi and Bluetooth. In some implementations, the network interface 202 may also support a wired network connection. The computing device also includes a processing system 204 having multiple processor devices, as well as a system memory 210 which can be a system virtual memory having an address space that includes volatile and non-volatile memory.

In one embodiment, the processing system 204 includes one or more application processor(s) 205 to execute instructions for user and system applications that execute on the computing device. The processing system can also include a sensor processor to process and monitor a suite of sensor devices 208 having sensors including, but not limited to motion sensors, light sensors, proximity sensors, biometric sensors, audio sensors (e.g., microphones), and image sensors (e.g., cameras). The sensor processor 206 can enable low-power monitoring of always-on sensors within the suite of sensor devices 208. The sensor processor 206 can allow the application processor(s) 205 to remain in a low power state when the computing device 200 is not in active use while allowing the computing device 200 to remain accessible via voice or gesture input to a virtual assistant 220. In one embodiment, the sensor processor 206 or a similar low power processor within the processing system can enable low power processing of media instructions provided by a media player 225. The media player 225 may be a modular media player that is capable of playback of a variety of different audio and/or video media types, including but not limited to MPEG-2, MPEG-4, H.264, and H.265/HEVC. In one embodiment, other formats may be supported via additional CODEC plugins.

In one embodiment, the virtual assistant 220 is an intelligent automated assistant system capable of engaging with a user in an integrated, conversational manner using natural language dialog. The virtual assistant 220 can invoke services external to the virtual assistant 220 and, if necessary, the computing device 200, to obtain information or perform various actions requested by a user. The virtual assistant 220 may be selectively given access to various software and hardware components within the computing device, including but not limited to the network interface 202 to retrieve data via a network, media playback applications to initiate or stop playback of media files, or user calendar data to schedule calendar events, tasks, reminders, or alarms. For example, and in one embodiment the virtual assistant 220 can communicate with an event scheduler 230 to schedule alarms or reminders via a calendar system in communication with an event server, such as the event server 110 of FIG. 1. Scheduled tasks can be added to an event list, such as events list 108 on a user device 102 or an event list 126 within a smart playback device 120. The virtual assistant 220 can also initiate playback of media. Where the computing device 200 is part of a distributed playback system, a distributed playback system module 212 can perform operations to manage various aspects of media playback, including but not limited to a playback queue manager 214 to manage a list of media to be played via a distributed playback system and a playback routing manager 216 to manage the specific elements of the distributed playback system that are used to play media.

In one embodiment, the event scheduler 230 can exchange data with the distributed playback system module 212. The data exchange can be performed in response to input received via a user interface of the computing device 200 or a different computing device that participates within the distributed playback system. The data exchange can also be performed in response to activity requested via the virtual assistant 220. For example, and in one embodiment, an event scheduled via the event scheduler 230 can be associated with a media playlist, such that upon occurrence of the scheduled event, a playlist can be played via the playback queue manager 214. For example, an alarm can be scheduled to wake a user at a specific time. The alarm can be associated with a playlist, such that one or more media elements will be played in association with or as a replacement for an alarm sound. In one embodiment, a playlist can be associated with any event scheduled via the event scheduler 230, including reminder or timer expiration events.

In one embodiment, the playback queue manager 214 can manage multiple simultaneous playback queues, where the playback queues include one or more past, present or future media elements to be played via the computing device 200.

The playback queues can be loaded with individual media elements or playlists that specify multiple media elements. The playback queues can include locally stored media, media that will be retrieved for playback via a media server (e.g., media server 140 as in FIG. 1) or media that will be streamed from a local or remote media streaming server. Multiple types of media elements may be played over the distributed playback system via the playback queue manager, including multimedia files such, as but not limited to music, music videos, and podcasts, including audio or video podcasts, or audio and/or video clips of current news, weather, or sports events.

Where one or more podcasts are selected for playback in response to the occurrence of a scheduled event, podcast selection logic can select a specific episode of a podcast for playback, such as the latest available episode of a podcast or the latest available unplayed podcast. Such selection can be determined from explicit user preferences or based on learned user preference information. The selection can also be performed based on the age of the available unplayed podcasts relative to the current date. In one embodiment, a podcast feed contains metadata that indicates whether the podcast feed is associated with a serial podcast or a news-style podcast. Whether to play the earliest unplayed episode or the latest episode can be determined at least in part based on such metadata.

In one embodiment, for example when setting a wake alarm, a news program or news channel may be selected for playback. The user may specific a specific program or channel for playback in response to the wake alarm. Alternatively, the user can select a generic news category and logic associated with the playback queue manager 214 can select the news program or news channel to play based on selected user preferences. In one embodiment, a news program preference can be determined based on news topic preferences selected in a news program on a user device.

In one embodiment, when an existing playback queue is in effect during a scheduled event that causes playback of a different playback queue, the playback queue manager 214 can manage the queues based on preferences selected by a user. In one instance the playback queue manager 214 can be configured to replace the existing playback queue with the new playback queue, removing the queued items of the existing playback queue and replacing them with the items of the new playback queue. In such instance, the items selected for playback in response to the alarm or other scheduled event replace and subsume the previously queue items. Alternatively, the playback queue manager 214 can be configured to implement a transient playback queue that is in effect only until the scheduled event is dismissed. After the scheduled event is dismissed, the playback items of the previously existing playback queue are restored to the active queue and playback of the previously existing queue can be resumed. The scheduled event can be dismissed via a voice command to the virtual assistant, via a user interface on the computing device 200, or a user interface of a user device connected to the computing device 200.

In one embodiment, the playback routing manager 216 can be used to select a playback device within the distributed playback system to use to play a playback queue. Depending on the number of playback devices within the distributed playback system, multiple different queues can be active on multiple different playback devices or multiple different playback devices within the distributed playback system can be grouped. Grouped playback devices can share a common playback queue and simultaneously play the same media. When a smart playback device is provisioned, the playback device can be associated with one or more users and/or one or more user accounts. The smart playback device can also be assigned a location and/or device type. In one embodiment, residential distributed playback network can be configured in which multiple user devices and play media via one or more smart playback devices within a residence. When a smart playback device is added to the residential network, a room or location of each playback device can be specified. An ownership can also be specified for each smart playback device that indicates whether the smart playback device is associated with a single user or if the smart playback device is associated with multiple users.

Groups and Zones Within a Distributed Connected Media Playback System

Figure 3:
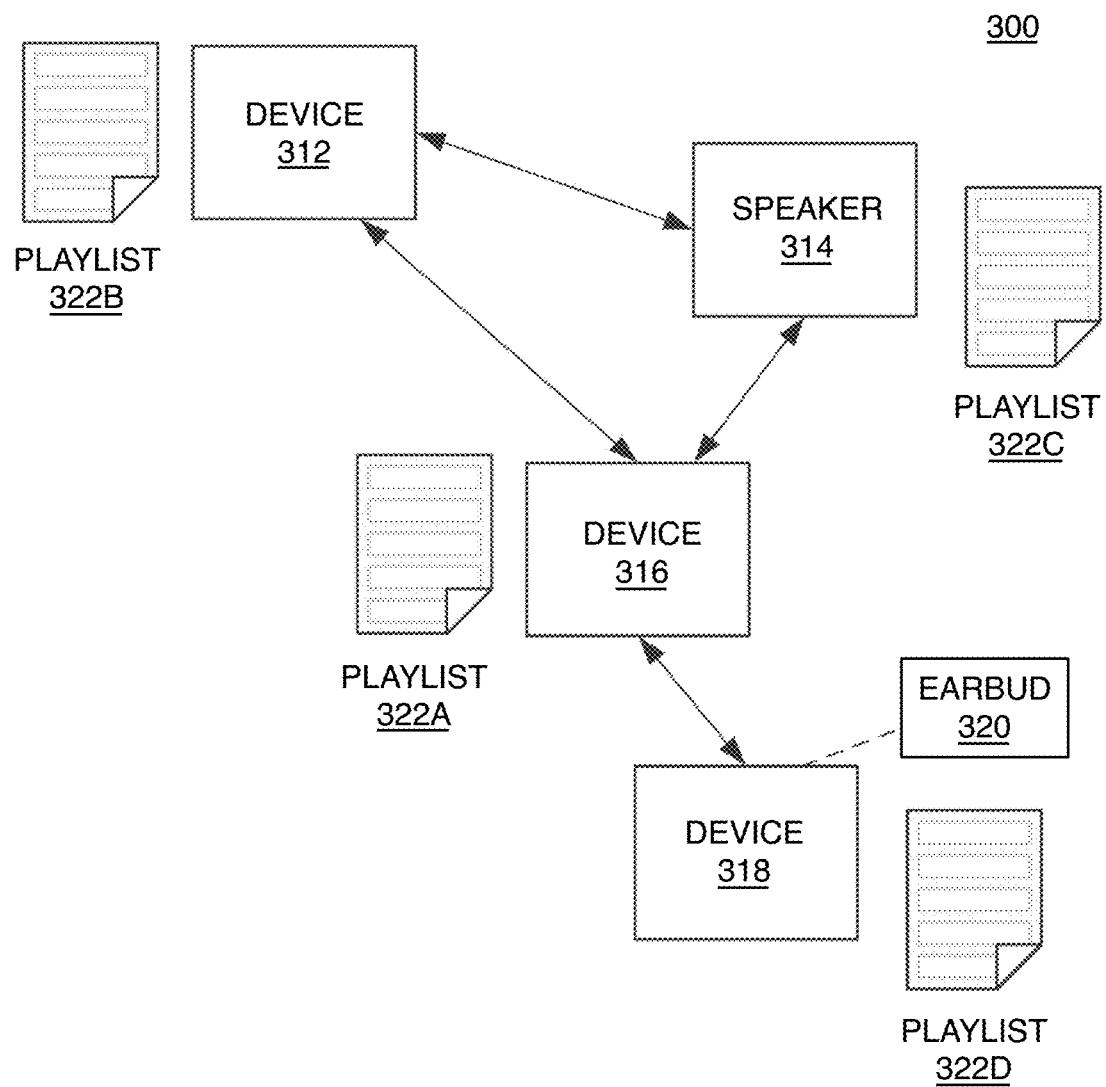
FIG. 3 illustrates a connected group media playback system, according to one embodiment.

FIG. 3 illustrates a connected group media playback system 300, according to one embodiment. The connected group media playback system 300 includes a plurality of connected devices 312, 316, 318 and one or more connected speaker(s) (e.g., speaker 314). The connected devices 312, 316, 318 can each be a variant of the user device 102 of FIG. 1. The speaker 314 can be a variant of the smart playback device 120 of FIG. 1. Accordingly, the connected devices 312, 316, 318 and speaker 314 may be any of the user devices or smart playback devices described herein, including but not limited to a personal device such as a handheld smart phone or other network enabled handheld device, a personal computer or laptop, a wearable electronic device, a smart-TV, or a set-top-device. The speaker 314 can represent multiple speakers within a single location that are configured for stereo or surround playback or multiple speakers in different locations, where one or more of the multiple speakers can be configured for multi-channel audio playback. One or more speakers may also be configured with a display to facilitate multimedia playback. In one embodiment, an in-car entertainment system as described can participate in the connected group media playback system 300 and can include both a user device and smart playback device.

The devices 312, 316, 318 and speakers 314 in the system may be connected via a wide-area communications network, such as the Internet, or via local network connections such as Wi-Fi, Bluetooth, Ethernet, or other methods of connecting devices. Some devices and/or speaker(s) can also connect via an ad hoc peer-to-peer network. For example, the devices may be compliant with one or more wireless communication protocols. In some embodiments, the devices may also be adapted to support proprietary peer-to-peer protocols such as Apple® Wireless Direct Link (AWDL). Other similar protocols also may be adopted in order to facilitate peer-to-peer communications. For peer-to-peer connections, the devices and speaker(s) may be connected in a full or partial mesh configuration. For example, a device 312 may be connected to the speaker 314 and an additional device 316 through a series of peer-to-peer communication links. Collectively, the plurality of devices and the speaker can form a playback group. Devices within a group can communicate and exchange playlists 322A-322D. In one embodiment the items in the playlist can be loaded into a playback group via a playback queue manager (e.g., playback queue manager 214 of FIG. 2) associated with each device and speaker.

In an embodiment, multiple devices may be connected to and in communication with a single control device but not with other devices within the connected group media playback system 300. For example, device 316 can be configured as a control device and device 312, device 318, and speaker 314 can each connect to device 316. In such configuration, device 318 may not communicate with device 312 except via the control device functionality provided by device 316. In various embodiments, the control device for a group can be a user device or a smart media playback device.

In one embodiment, a device within the connected group media playback system 300 can connect with other devices to download media resources listed within the playlists 322A-322D. In various embodiments, the items in each playlists 322-322D can explicitly specify a type and location in which the item is stored or logic within a distributed playback system module (e.g., distributed playback system module 212 as in FIG. 2) can automatically determine a location from which the media item may be retrieved. In one embodiment media items can be retrieved from storage local to the respective device, from a remote media server (e.g., media server 140 of FIG. 1), or from other one of the connected devices based on network connectivity and media availability.

In one embodiment, when devices 312, 316, 318 and speaker 314 are connected within a group, media playback for the group can be directed via a designated control device within the system. The control device can manage a single playlist for the group and the playlists that are used or displayed at the devices may be coordinated with the playlist maintained by the control device. Group members can modify the group playlist and such modifications can be propagated to the group in a real-time manner. Editing and/or control options for a group member may include pausing, rewinding, fast forwarding, skipping, adding, deleting, etc. For a single device playing the synchronized playlist, modifications to the playlist will be reflected in the playback of the multimedia. In one embodiment the specific type of modifications allowed to the playlist at the control device may be configured by the control device. Additionally, the control device can allow modifications to be made by certain devices within the group while disallowing modifications for other devices in the group. Such configuration can be made at the device or account level. For example, the control device can configure different user accounts associated with devices within the group to have different levels of access, such that any device associated with a designated account will have playlist modification access, while other devices associated with a different account will not have the ability to modify group playlists. For example and in one embodiment, the various user accounts associated with the various devices can be part of a family of related accounts that are associated with a family of users. In such embodiment, accounts designated as 'parent' accounts may have differing levels of group playlist access relative to accounts designated as simply 'adult' accounts, while 'child' accounts can have different levels of group playlist access relative to 'parent' or 'adult' accounts.

In one embodiment, in addition to the speaker 314, device 312, 316, and 318 can be or include a traditional device or a smart playback device. For example, device 312 can be a smart playback device instead of a user device. Alternatively, device 312 may be a user device that can function s a smart playback device. In one embodiment, device 312 can be a wearable electronic device that can perform functions of a user device, and can at least temporarily serve as a smart playback device. For example, device 312 can be configured to play media associated with a scheduled event. For example, device 312 can be a smartwatch device or another wearable electronic device. If, for example, via Bluetooth ranging, the device 312 or a control device determines that the user is out of range or otherwise away from any other playback device within the connected group media playback system 300, alarms or other event reminders, and any associated playlists, can be played via the device 312 instead of other playback devices in the group.

In one embodiment alarms and associated playlists can be played on all speakers in the group that are local to and/or within a pre-determined range relative to a user for which the alarm or event is associated. For example, device 312 can be an in-car entertainment system that includes a traditional playback device and/or speaker 314 can be a smart playback device associated with and controlled by device 312. If an alarm or event were to occur while the user is in a vehicle containing the in-car entertainment system, the alarm or event, and any associated playlist, can play on the in-car entertainment system (e.g., device 312 and/or speaker 314).

In one embodiment, a control device of the system can be aware of the output device state of each device within the group. For example, if device 316 is a control device for a group, device 316 can be aware that device 318 has multiple connected output device, such as an internal speaker and a connected earbud 320. In such configuration, a playback routing manager (e.g., playback routing manager 216 of FIG. 2) can allow audio routing logic internal to device 318 to determine the output device with which to play any media or alerts or can explicitly direct the device 318 to output media audio via a specific output device attached to the device 318.

In one embodiment devices within the connected group media playback system 300 can be sub-grouped into zones. For example, where multiples instances of the speaker 314 and/or the devices 312, 316, 318 are stationary or semi-stationary devices, a precise or general location can be associated with the speaker or device. For example, device 312 can be a stationary or semi-stationary desktop computing device and the speaker 314 can represent one or more stationary or semi-stationary smart media playback device. In this example, a semi-stationary device or speaker is a device or speaker that is intended to remain in a single location but can be moved to a different location, while a stationary device or speaker is designed to be fixed in place, such as a device or speaker associated with a wall mounted smart thermostat, wall mounted computing device, wall or ceiling mounted smart-speaker, or a smart appliance such as a smart kitchen appliance.

In various embodiments, multiple zone configuration techniques can be used. In one embodiment, a zone can be a region or group of locations associated with each device. The associated zone can be used to determine playback and routing for a playback queue or playlist. In one embodiment, a location or identifier can be assigned to devices and, based on the location or identifier, the device can be automatically associated with a zone. Alternatively, a device can be explicitly assigned both a zone and an identifier, where the zone can be used to indicate a general location of the device and the identifier can indicate a user or users associated with the device and/or whether the device is identified as a personal device for one or more closely connected or similar users or whether the device is a common or communal device that is shared by multiple users that may have dissimilar configuration or media preferences. In the case of a communal device (including a communal smart speaker device), media preferences learned about a user will not be used to influence media selection when automated media playback is requested. Additionally, media requested for playback will not influence the media preferences of users associated with the device. In contrast, a personal device can inherit and influence the learned media preferences associated with a user.

Figure 4A:
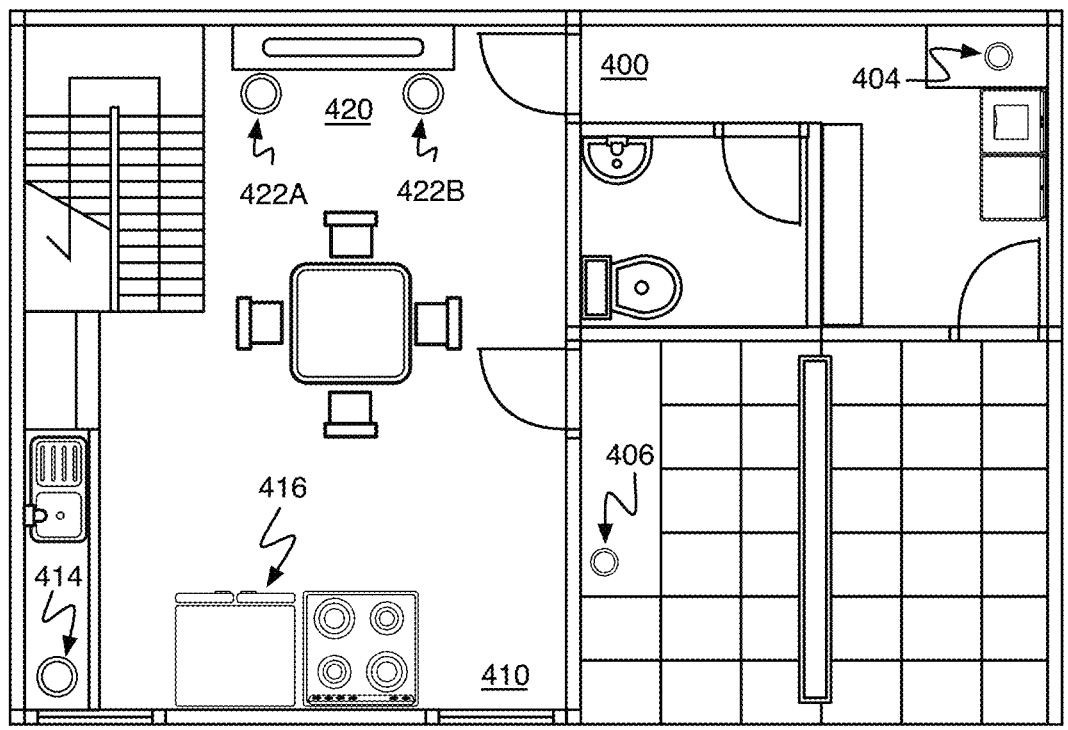
FIGS. 4A-4B illustrate zones that may be established within a connected group media playback system, according to an embodiment.
Figure 4B:
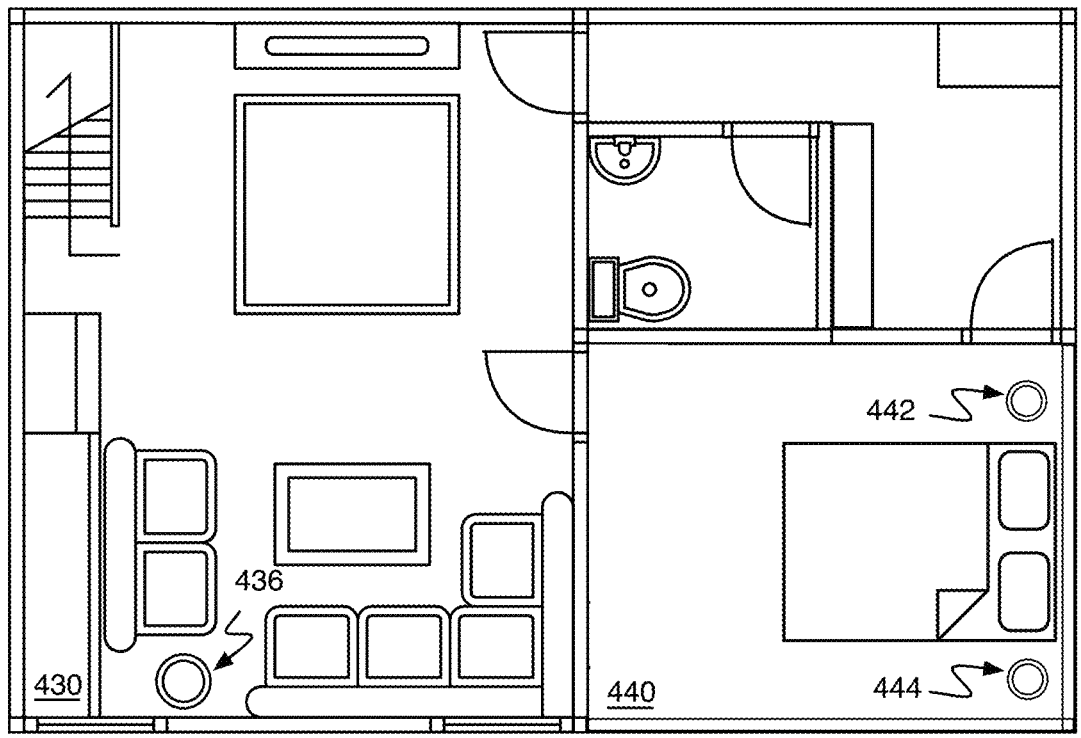

FIGS. 4A-4B illustrate zones that may be established within a connected group media playback system, according to an embodiment. FIG. 4A illustrates a first set of zones. FIG. 4B illustrates a second set of zones. In one embodiment, each smart playback device within the connected group can be as assigned an identifier and associated with one or more user devices. The devices can also be assigned to a zone or the devices can be assigned a location that can be correlated with a zone. One or more control devices in the network can determine which zone or which device within a zone will be assigned playback of an alert task or media queue. The zones illustrated are exemplary of one embodiment and are not limiting as to all embodiments. Various embodiments may allow the definition or determination of a variety of different zones. In one embodiment, a pre-defined set of zones are provided and additional zones may be user defined.

FIG. 4A illustrates a first set of zones including a utility zone 400, a kitchen zone, and a dining room zone 420. The utility zone 400 can include multiple smart media playback devices, including a first device 404 assigned to a laundry room location, and a second device 406 assigned to a garage location. The utility zone 400 can be a pre-defined zone or a user-defined zone to which the devices of the illustrated locations can associated. Although not illustrated, an additional device can be a mobile smart media playback device located within a vehicle or can be an in-car information and/or entertainment (e.g., infotainment) system installed within a vehicle. The kitchen zone 410 can include a fourth smart media playback device 414, such as a wall-mounted smart media playback device, in a first kitchen location. The kitchen zone 410 can also include a smart appliance device 416, such as a smart refrigerator device, within a second kitchen location. The dining room zone 420 can include multiple co-located devices 422A, 422B that can be grouped as a single virtual device configured to play back different audio channels.

FIG. 4B illustrates a second set of zones including a living room zone 430 and a bedroom zone. The living room zone 430 includes a fifth smart playback device 436 having a living room location. The bedroom zone 440 can include a sixth smart media playback device 442 having a first bedroom location and a seventh smart media playback device 444 having a second bedroom location.

In one embodiment, all the smart playback devices within each zone illustrated within FIG. 4A-4B can be assigned to a residential group. All devices within the residential group can be synchronized to simultaneously play the same media, alerts, alarms, notifications, and/or playlist associated with an alert or alarm. In one embodiment devices within each zone can be synchronized to play media or alerts as a group. In one embodiment, for certain types of alerts, one or more devices within a zone can temporarily decouple from other devices in the zone and initiate playback of a playlist in response to an alert or alarm without changing the behavior of other playback devices within the zone.

For example, the sixth smart media playback device 442 at the first bedroom location can be associated with a different user than the seventh smart media playback device 444 at the second bedroom location. Each user can configure different morning alarms to play at different times, with each alarm associated with separate media playlists. Even through the sixth smart media playback device 442 and the seventh smart media playback device 444 are within the same zone (e.g., bedroom zone 440), at the occurrence of specific alarms associated with specific users, the respective devices can temporarily decouple from the zone to play a user specific alert or alarm and/or a playlist associated with the user specific alert or alarm.

One or more of the smart media playback devices within the group can be capable of audio output and voice command input, but may lack display devices on which scheduled events (e.g., alerts, alarms, timers, reminders, etc.) can be displayed. To give proper context to a scheduled event, each scheduled event can be assigned a label. The label can be spoken by the media playback device upon occurrence of the event. In one embodiment, each scheduled alert, alarm, or reminder can be automatically associated with a label based on voice input provided to the virtual assistant when scheduling the event. For example a user can issue a voice command to a virtual assistant at a smart media playback device to scheduler a reminder to perform a future event (e.g., "Remind me to take the BBQ off the grill in 10 minutes."). The virtual assistant can then request confirmation of the event (e.g., "OK, I will remind you to take the BBQ off the grill in 10 minutes.") A timer event can then be scheduled to count down for 10 minutes or an event can be scheduled to occur 10 minutes into the future. At the occurrence of the event or the expiration of the timer, the voice assistant can issue a voice alert to the user (e.g., "Time to take the BBQ off the grill!"). The voice alert can be accompanied with a pre-selected sound. In addition to issuing the alert, the smart media playback device can also begin playback of a pre-selected set of media items, such as a media playlist.

Context Based Scheduling of Alerts

In one embodiment, voice commands issued to a virtual assistant on a smart media playback device can cause alerts to be scheduled in a context sensitive manner. A user can issue a voice command to any smart media playback device within a group of smart media playback devices and the command can be executed by or scheduled to the appropriate smart media playback device based on context. In various embodiments, and based on context information associated with an alert on alarm, the routing logic can either schedule the alert or alarm to occur on a specific device, route audio output associated with the alert or alarm to the specific device, or direct the specific device to play the alert or alarm via media playback logic on the specific device.

For example, wakeup alarms can be intelligently scheduled to the smart media playback device within a user's bedroom, even if the user were to issue a voice command to schedule a wakeup on a different smart media playback device. For example, a user can use a voice assistant to schedule the wakeup event on the fourth smart media playback device 414 within the kitchen zone 410. Routing logic within the fourth smart media playback device 414 can then intelligently schedule the event to occur on the sixth smart media playback device 442 or the seventh smart media playback device 444 in the bedroom zone. In one embodiment, a shopping related reminder can be intelligently scheduled to a smart media playback device associated with a smart appliance. For example, a reminder to buy grocery items can be verbally requested via the sixth smart media playback device 442 in the bedroom zone 440 and the reminder can be intelligently routed to a smart appliance device 416, such as a smart refrigerator device.

In one embodiment, events can be scheduled to multiple media playback devices based on the context of the request. For example, a user can issue a voice command to the virtual assistant (e.g., "Wake up the kids at 8:00 AM tomorrow.").

Based on account or configuration settings associated with the group of smart media playback devices, the virtual assistant can determine the users identified by "the kids" and schedule a wakeup event to one or more smart media devices associated with the identified users. The ability to schedule events for different users can be limited based on settings associated with the users or an account type associated with the users. In one embodiment, the user issuing the voice command can be determined based on the device that receives the command. In one embodiment, the voice assistant is able to determine the user that issues the command via voice analysis and comparison of the requesting voice to a voice pattern associated with a user.

Figure 5A:
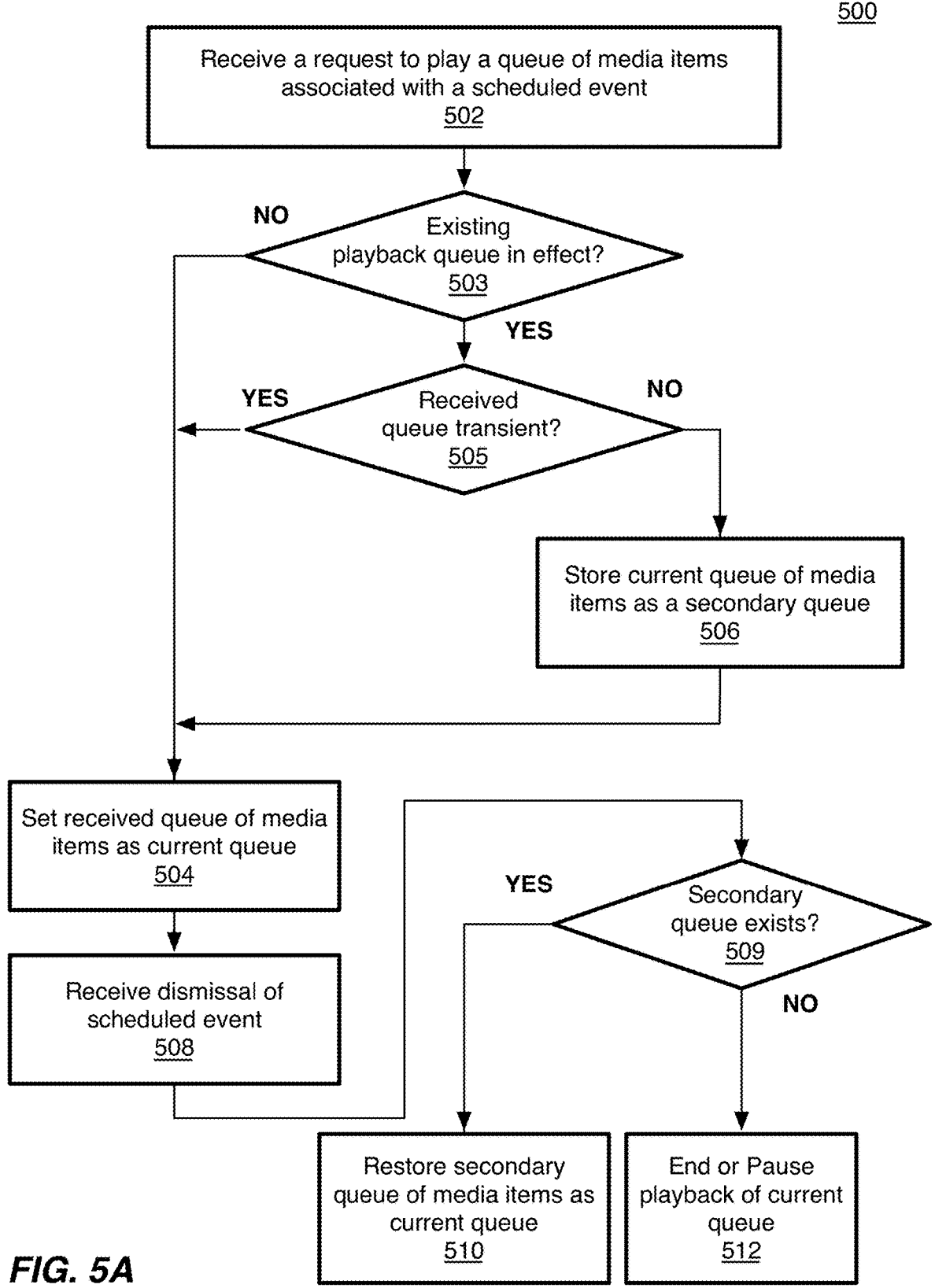
FIGS. 5A-5D are flow diagrams illustrating operations associated with logic to perform playback queue and routing management for a group of smart media playback devices, according to embodiments described herein.
Figure 5B:
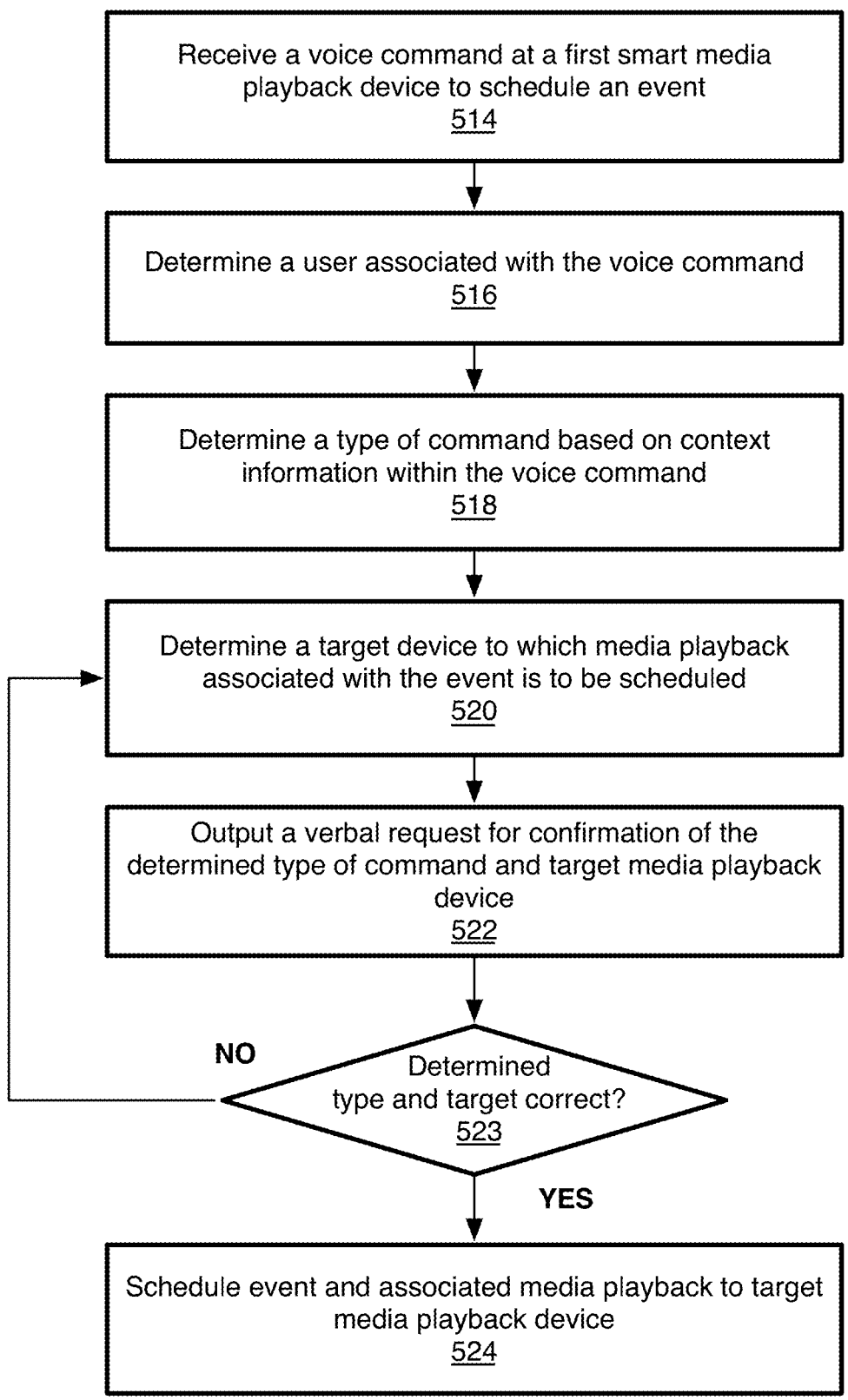
Figure 5C:
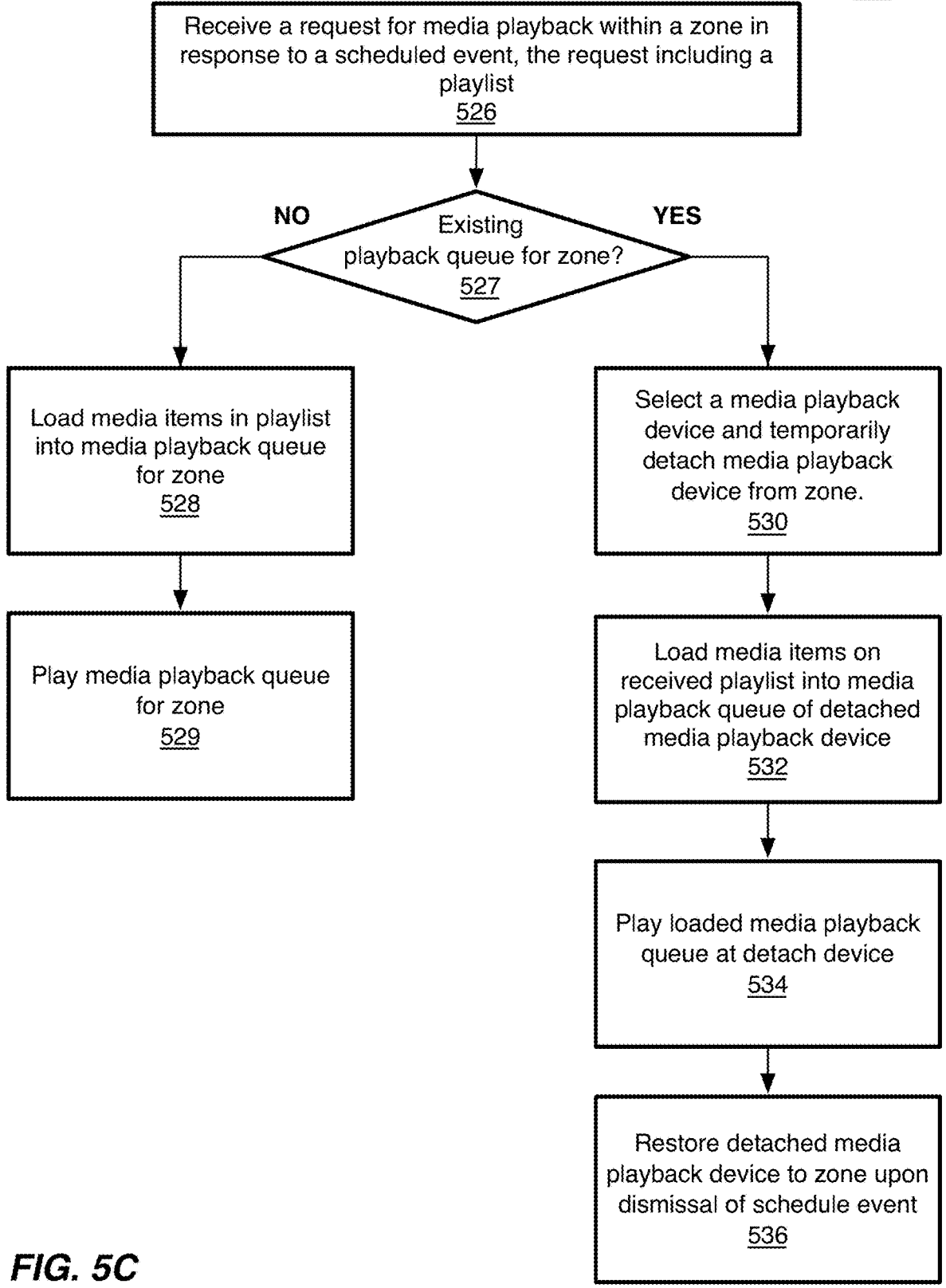
Figure 5D:
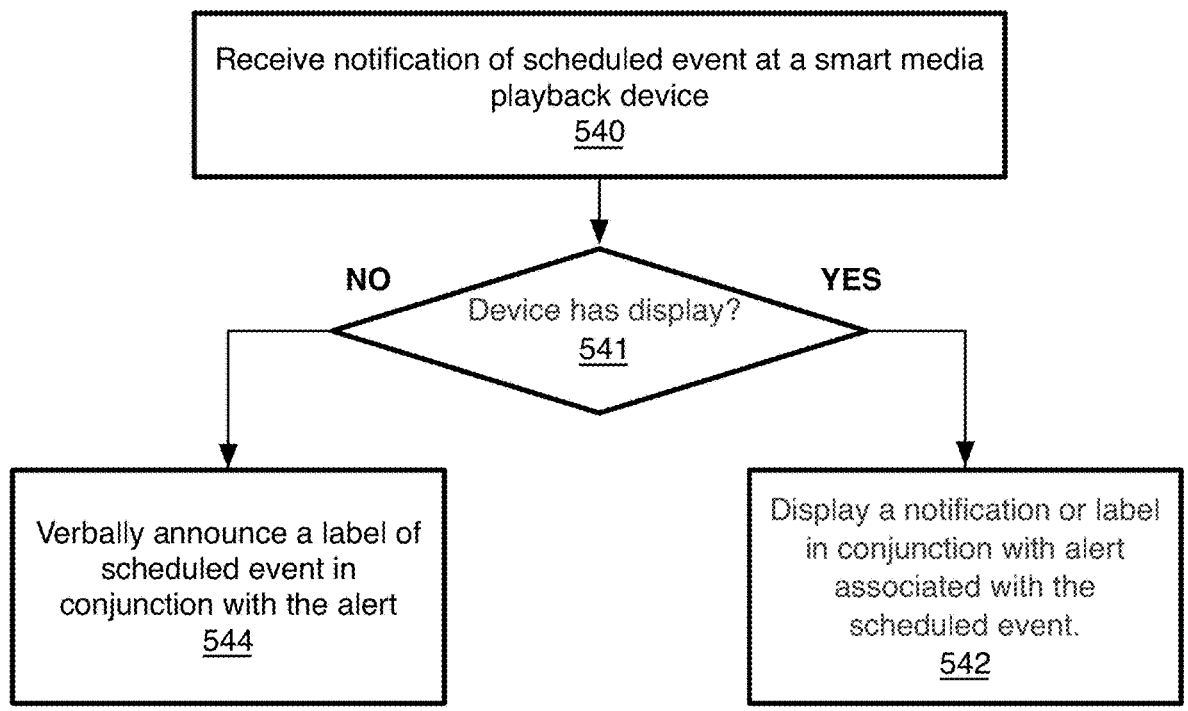

FIGS. 5A-5D are flow diagrams illustrating operations associated with logic 500 to perform playback queue and routing management for a group of smart media playback devices, according to embodiments described herein. FIG. 5A illustrates operations to manage playback queues on a smart media playback device in response to a playback event. FIG. 5B illustrates operations to perform context based scheduling of alerts. FIG. 5C illustrates operations for media playback at a subset of devices within a zone. FIG. 5D illustrates notification options for event labels. The operations can be implemented by a smart media playback device including a virtual assistant, as described herein.

As shown in FIG. 5A, the logic 500 can receive a request to play a queue of media items associated with a scheduled event, as shown at block 502. The request can be to playback media to a single smart media playback device, to a zone of devices, or to an entire group of devices. The logic 500 can then determine at block 503 whether an existing playback queue is in effect. If no existing playback queue is in effect (e.g., no media items are playing on the smart media devices), the logic 500 can set the received queue of media items as the current playback queue for the smart media device, zone, or group of smart media devices, as shown at block 504. If an existing playback queue is in effect at block 503, the logic 500 can determine at block 505 whether the received queue is marked as a transient queue. In one embodiment, a transient queue is a playback queue that is in effect only until the scheduled event is dismissed. For example, a playback queue associated with an alarm event can be a transient queue. The transient status of a playback queue can be determined based on the type of event associated with the playback queue or can be determined via metadata for the playback queue. If the received queue is a transient queue, the logic can proceed to block 504 to set the received queue of media items as the current queue. If, at block 505, the logic determines that the received queue is not a transient queue, the logic 500 can store the current queue of media items as a secondary queue, as shown at block 506, before proceeding to block 504.

The received queue of media items associate with the scheduled event can be in effect until the logic 500 receives dismissal of the scheduled event at block 508. Dismissal of the scheduled event can include cancelling an alert or notice associated with the triggering of the event. The dismissal can occur via a voice command to a virtual assistant, via a user interface on the device issuing the alert, or via user interface of a device connected to the device issuing the alert. After dismissal of a scheduled event, the logic 500 can determine, at block 509, whether a secondary queue exists that should be restored. If a secondary queue exists that represents the active queue at the time in which the event was received, the logic 500 can restore the secondary queue of media items as the current queue, as shown at block 510. Otherwise, the logic 500 can end or pause playback of the current queue, as shown at block 512, upon dismissal of the scheduled event.

As shown in FIG. 5B, the logic 500 can receive a voice command at a first smart media device to schedule an event, as shown at block 514. After receiving the command, the logic 500 can perform an operation 516 to determine a user (e.g., user account) associated with the voice command. The user or user account associated with a voice command can be determined based on a user account associated with the smart media playback device from which the voice command originated or via voice analysis of the voice command. The logic 500 can then perform an operation 518 to determine a type of command based on context information within the voice command. For example, the voice command received at block 514 can explicitly state, "remind me," to "do a task" at "a specified time," and natural language processing logic can determine that the type of command is to set a reminder. The voice command can also state, for example, "wake me up" at "a specified time" (e.g., 8:00 AM). The term, "wake me up" can indicate that the voice command is to set a wake alarm.

Having determined the type of command, the logic 500 can perform an operation 520 to determine a target device to which the media playback associated with the event is to be scheduled. For example, the logic 500 can determine that a wake alarm is to be scheduled for playback at a smart media playback device within a bedroom location of the identified user. The logic 500 can the perform an operation to output 522 a verbal request for confirmation of the determined type of command and target media playback device. For example, the logic 500 can output a verbal statement for confirmation that states "OK, I will wake you up at your bedroom device at 8:00 AM," in response to a request that does not explicitly state a target device for the alert. The user can verbally acknowledge that the command was correctly stated or can issue a correction. Based on an acknowledgement or correction, as determined at block 523, the logic 500 can confirm whether the determined type and target are correct. Where a correction is issued, the logic 500 can return to operation 520 to re-determine the target device. If the command was correctly stated, the logic 500 can schedule the event and associated media playback to the determined target media playback device, as shown at block 524.

As shown in FIG. 5C, logic 500 can receive a request for media playback within a zone in response to a scheduled event, as shown at block 526. The request can include a playlist of media items for playback. The logic 500 can perform an operation 527 to determine if an existing playback queue is active for the zone. If no existing playback queue is active for the zone, the logic 500 can perform an operation 528 to load media items in a playlist into a media playback queue for the zone, followed by an operation 529 to play the media playback queue for the zone.

If operation 527 determines that an existing media playback queue is active for the zone, the logic 500 can select a media playback device within the zone and temporary detach the media playback device from the zone. The media playback device selected can vary based on the scheduled event. If the scheduled event is an alert of an alarm associated with a specific user, the selected media playback device can be a smart media playback device in the room of the user associated with the alert or a specific smart media playback device of the user associated with the alert. In one embodiment, the media playback device may be a user device, such as a wearable electronic device.

Once a media playback device is selected, the logic 500 can perform an operation 532 to load media items on the received playlist into the media playback queue of the detached media playback device and perform an additional operation 534 to play the loaded media playback queue at the detached device. The logic 500 can then restore the detached media playback device to the zone upon dismissal of the scheduled event, as shown at block 536.

The media playback device selected to play an alarm or notification, or a playlist associated with an alarm or notification may or may not have an internal display device, and some implementations of the smart media playback device do not have displays to display labels associated with events. Accordingly, the notification mechanism for a label can vary based on device type. As shown in FIG. 5D, in response to receiving notification of a scheduled event at a smart media playback deice at block 540, the logic 500 can determine whether the smart media playback device has a display screen suitable for displaying notifications, as shown at block 541. If the smart media playback device has such display, the logic 500 can display a notification or label in conjunction with an alert associated with the scheduled event, as shown at block 542. If the smart media playback device does not have a display capable of displaying labels or notifications, the logic 500 can verbally announce a label of the scheduled event in conjunction with the alert, as shown at block 544. The label can be determined using a text label entered by a user or via a natural language processor if the event is scheduled via a virtual assistant. It will be understood that, in some embodiments, a small or low resolutions display may be present on a media playback device or smart media playback device that may be able to convey limited information to a user without being of sufficient size or resolution to display labels or notifications. Such devices may be classified as lacking a display and can be configured to verbally announce the labels associated with scheduled events.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 6:
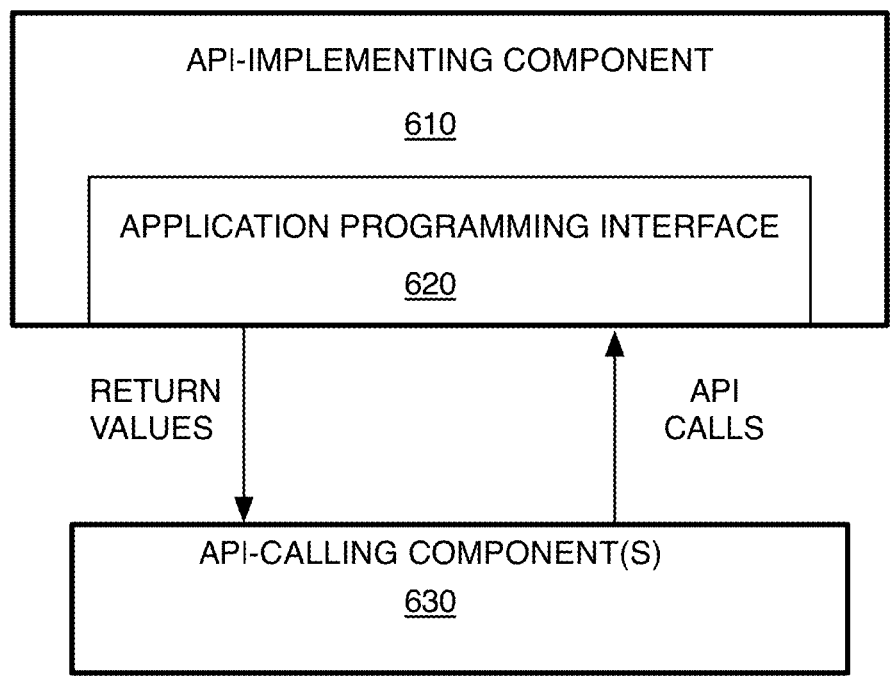
FIG. 6 is a block diagram illustrating an exemplary API architecture, which may be used in some embodiments of the invention.

FIG. 6 is a block diagram illustrating an exemplary API architecture, which may be used in some embodiments of the invention. As shown in FIG. 6, the API architecture 600 includes the API-implementing component 610 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module), makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 6 illustrates a single API-calling component 630 interacting with the API 620, it should be understood that other API-calling components, which may be written in different languages (or the same language) than the API-calling component 630, may use the API 620.

The API-implementing component 610, the API 620, and the API-calling component 630 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 7A:
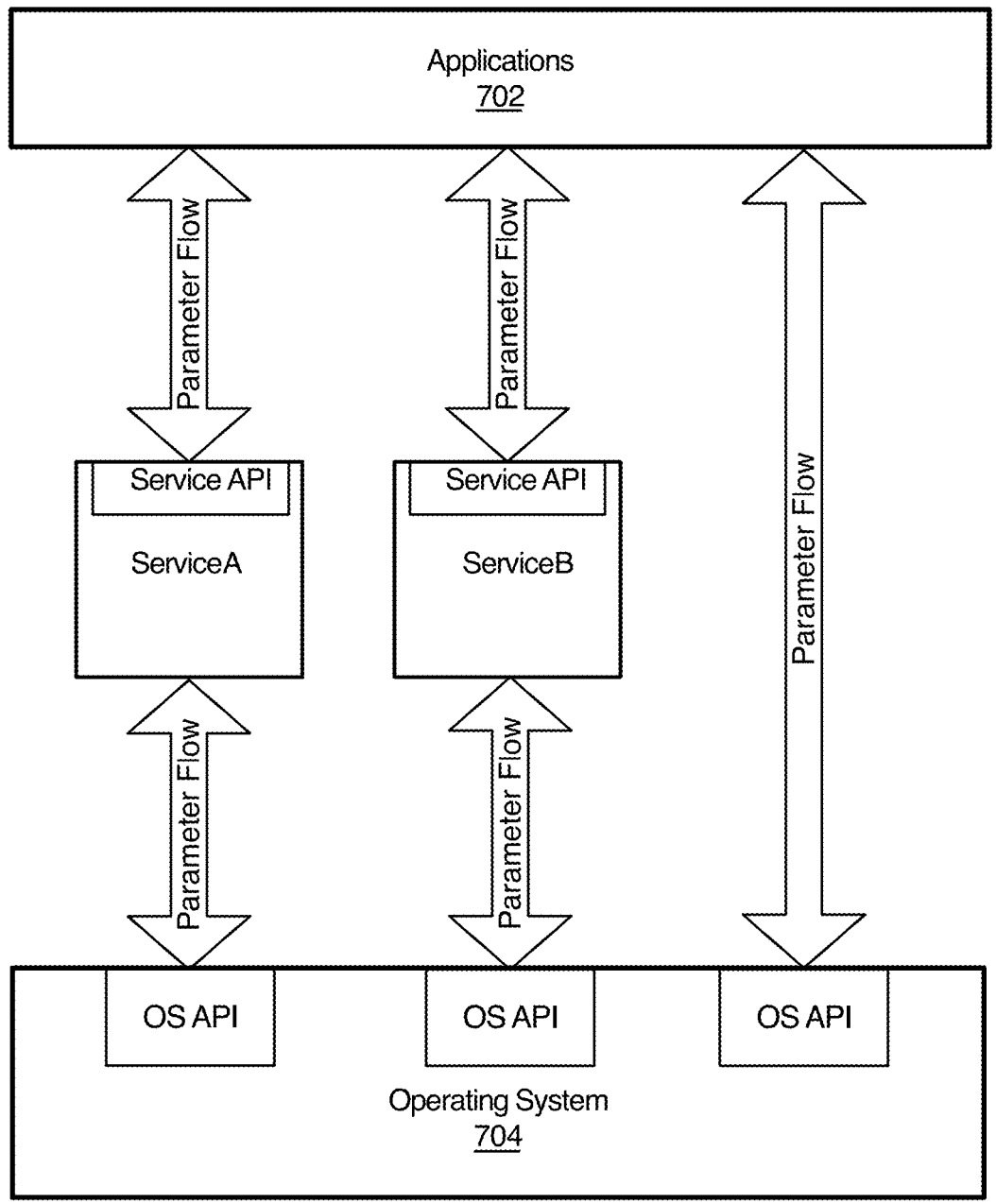
FIGS. 7A-7B are block diagrams of exemplary API software stacks, according to embodiments.
Figure 7B:
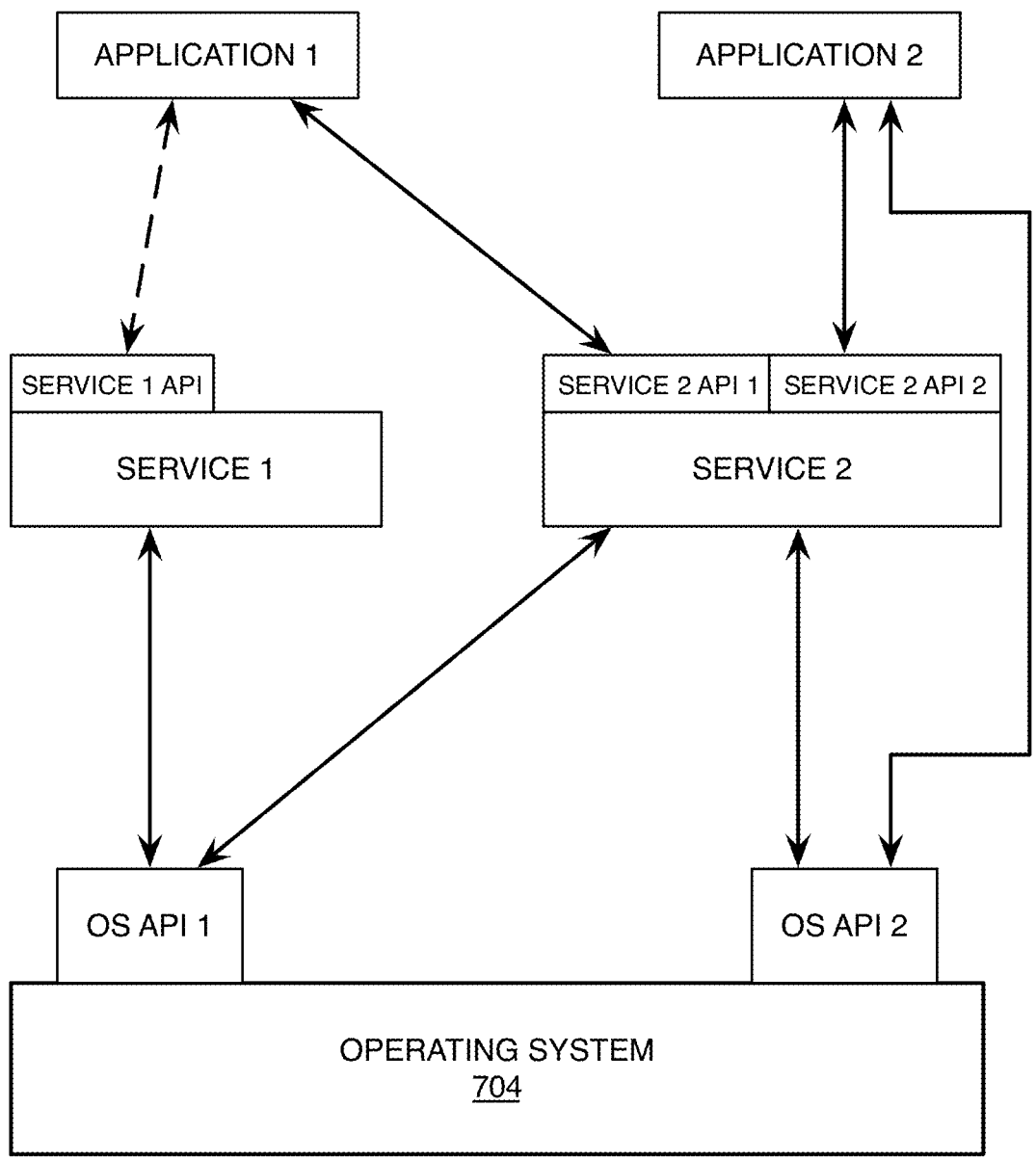

FIGS. 7A-7B are block diagrams of exemplary software stacks 700, 710, according to embodiments. FIG. 7A shows an exemplary API software stack 700 in which applications 702 can make calls to Service A or Service B using Service API and to Operating System 704 using an OS API. Additionally, Service A and Service B can make calls to Operating System 704 using several OS APIs.

FIG. 7B shows an exemplary software stack 710 including Application 1, Application 2, Service 1, Service 2, and Operating System 704. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Additional Exemplary Computing Devices

Figure 8:
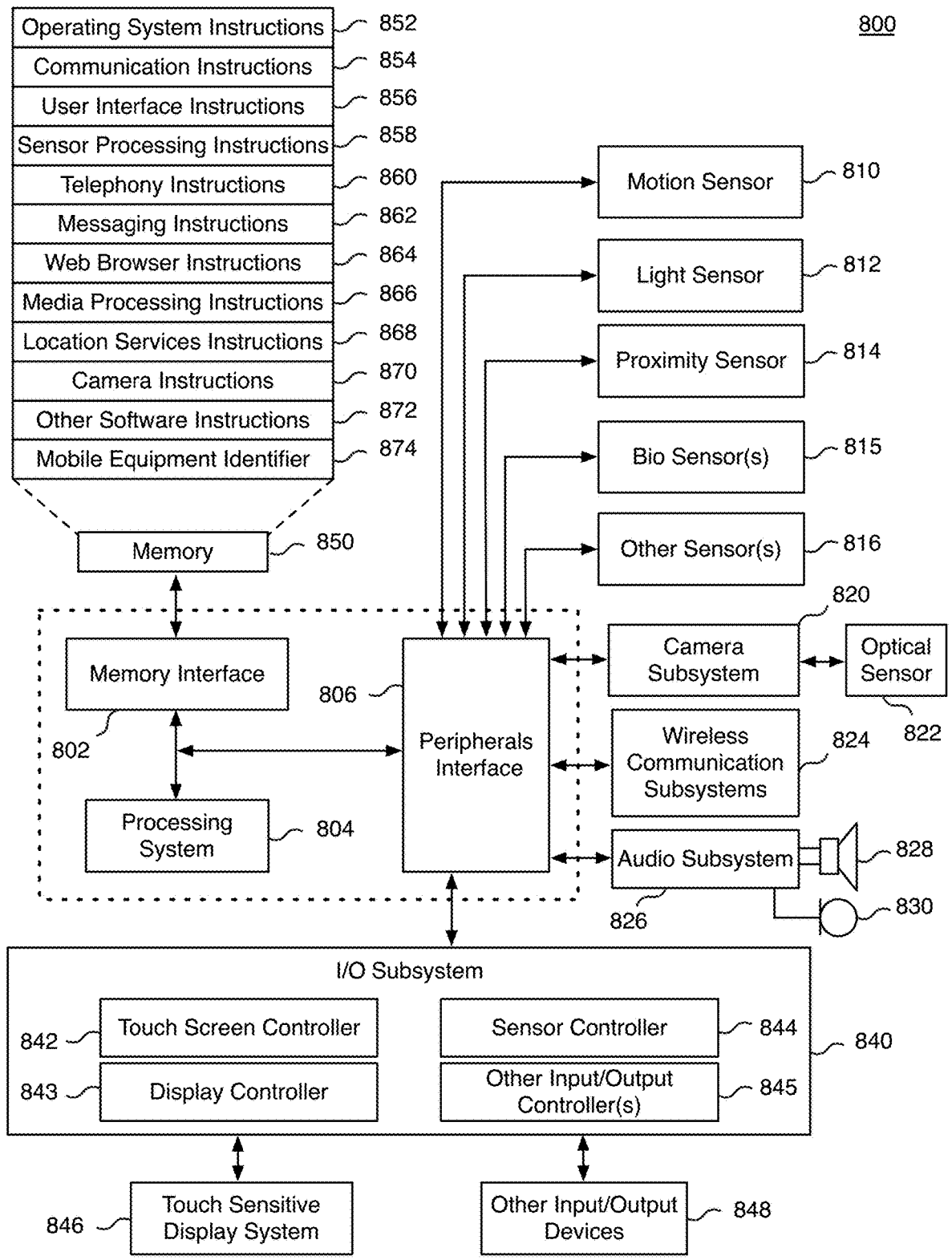
FIG. 8 is a block diagram of mobile device architecture, according to an embodiment.

FIG. 8 is a block diagram of a device architecture 800 for a mobile or embedded device, according to an embodiment. The device architecture 800 includes a memory interface 802, a processing system 804 including one or more data processors, image processors and/or graphics processing units, and a peripherals interface 806. The various components can be coupled by one or more communication buses or signal lines. The various components can be separate logical components or devices or can be integrated in one or more integrated circuits, such as in a system on a chip integrated circuit.

The memory interface 802 can be coupled to memory 850, which can include high-speed random-access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate the mobile device functionality. One or more biometric sensor(s) 815 may also be present, such as a fingerprint scanner for fingerprint recognition or an image sensor for facial recognition. Other sensors 816 can also be connected to the peripherals interface 806, such as a positioning system (e.g., GPS receiver), a temperature sensor, or other sensing device, to facilitate related functionalities. A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the wireless communication subsystems 824 can depend on the communication network(s) over which a mobile device is intended to operate. For example, a mobile device including the illustrated device architecture 800 can include wireless communication subsystems 824 designed to operate over a GSM network, a CDMA network, an LTE network, a Wi-Fi network, a Bluetooth network, or any other wireless network. In particular, the wireless communication subsystems 824 can provide a communications mechanism over which a media playback application can retrieve resources from a remote media server or scheduled events from a remote calendar or event server.

An audio subsystem 826 can be coupled to a speaker 828 and a microphone 830 to facilitate voice-enabled functions, such as voice recognition, voice replication, digital recording, and telephony functions. In smart media devices described herein, the audio subsystem 826 can be a high quality audio system including support for virtual surround sound.

The I/O subsystem 840 can include a touch screen controller 842 and/or other input controller(s) 845. For computing devices including a display device, the touch screen controller 842 can be coupled to a touch sensitive display system 846 (e.g., touch-screen). The touch sensitive display system 846 and touch screen controller 842 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 846. Display output for the touch sensitive display system 846 can be generated by a display controller 843. In one embodiment, the display controller 843 can provide frame data to the touch sensitive display system 846 at a variable frame rate.

In one embodiment, a sensor controller 844 is included to monitor, control, and/or processes data received from one or more of the motion sensor 810, light sensor 812, proximity sensor 814, or other sensors 816. The sensor controller 844 can include logic to interpret sensor data to determine the occurrence of one of more motion events or activities by analysis of the sensor data from the sensors.

In one embodiment, the I/O subsystem 840 includes other input controller(s) 845 that can be coupled to other input/control devices 848, such as one or more buttons, rocker switches, thumb-wheel, infrared port, USB port, and/or a pointer device such as a stylus, or control devices such as an up/down button for volume control of the speaker 828 and/or the microphone 830.

In one embodiment, the memory 850 coupled to the memory interface 802 can store instructions for an operating system 852, including portable operating system interface (POSIX) compliant and non-compliant operating system or an embedded operating system. The operating system 852 may include instructions for handling basic system services and for performing hardware dependent tasks. In some implementations, the operating system 852 can be a kernel.

The memory 850 can also store communication instructions 854 to facilitate communicating with one or more additional devices, one or more computers and/or one or more servers, for example, to retrieve web resources from remote web servers. The memory 850 can also include user interface instructions 856, including graphical user interface instructions to facilitate graphic user interface processing.

Additionally, the memory 850 can store sensor processing instructions 858 to facilitate sensor-related processing and functions; telephony instructions 860 to facilitate telephone-related processes and functions; messaging instructions 862 to facilitate electronic-messaging related processes and functions; web browser instructions 864 to facilitate web browsing-related processes and functions; media processing instructions 866 to facilitate media processing-related processes and functions; location services instructions including GPS and/or navigation instructions 868 and Wi-Fi based location instructions to facilitate location based functionality; camera instructions 870 to facilitate camera-related processes and functions; and/or other software instructions 872 to facilitate other processes and functions, e.g., security processes and functions, and processes and functions related to the systems. The memory 850 may also store other software instructions such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. A mobile equipment identifier, such as an International Mobile Equipment Identity (IMEI) 874 or a similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions may be implemented in hardware and/or in software, including in one or more signal processing and/or application specific integrated circuits.

Figure 9:
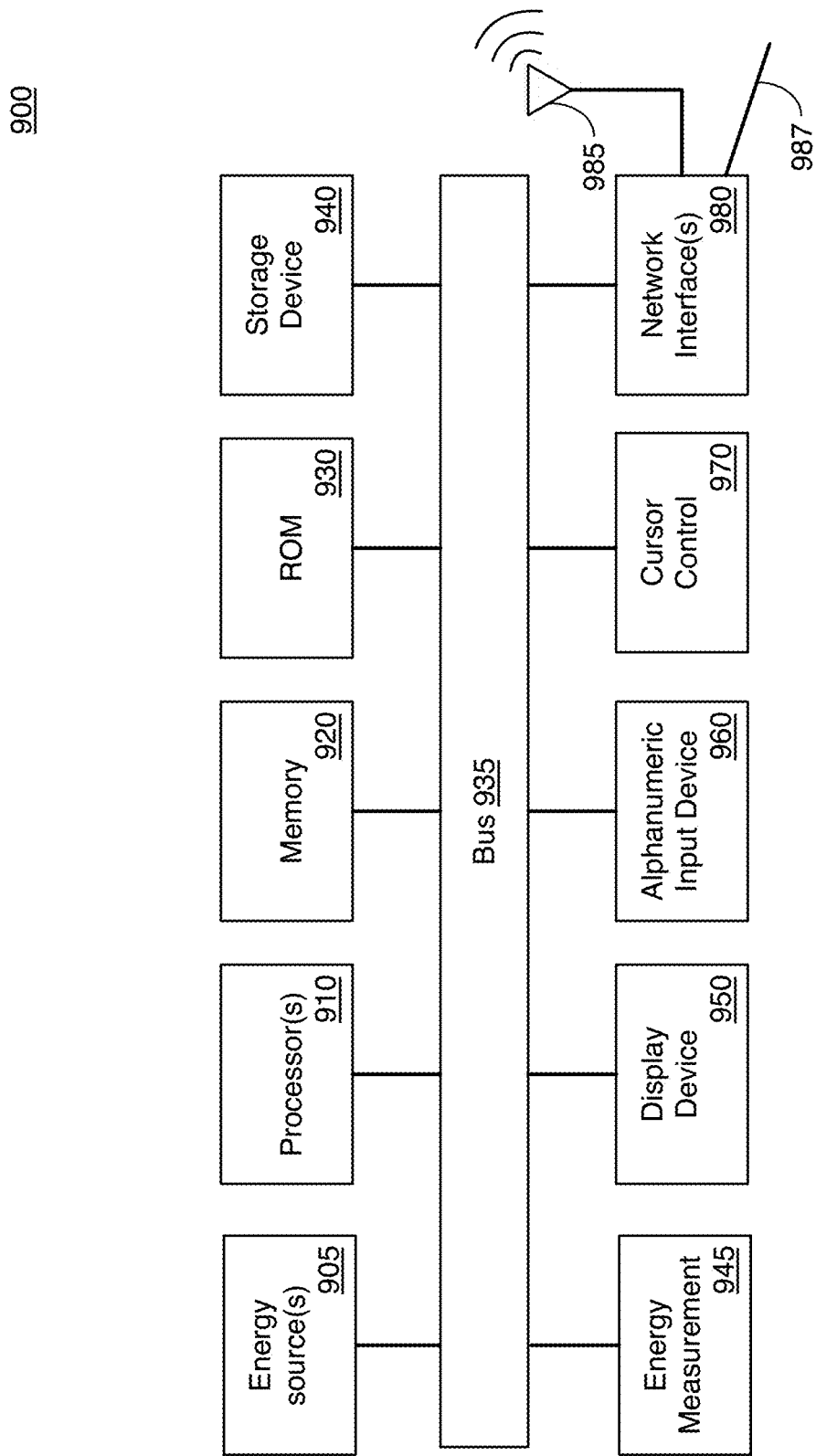
FIG. 9 is a block diagram of one embodiment of a computing system.

FIG. 9 is a block diagram of one embodiment of a computing system 900. The computing system illustrated in FIG. 9 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system of FIG. 9 may be used to provide the computing device and/or a server device to which the computing device may connect.

The computing system 900 includes bus 935 or other communication device to communicate information, and processor(s) 910 coupled to bus 935 that may process information. While the computing system 900 is illustrated with a single processor, the computing system 900 may include multiple processors and/or co-processors. The computing system 900 further may include random access memory 920 (RAM) or other dynamic storage device coupled to the bus 935. The memory 920 may store information and instructions that may be executed by processor(s) 910. The memory 920 may also be used to store temporary variables or other intermediate information during execution of instructions by the processor(s) 910.

The computing system 900 may also include read only memory (ROM) 930 and/or another data storage device 940 coupled to the bus 935 that may store information and instructions for the processor(s) 910. The data storage device 940 can be or include a variety of storage devices, such as a flash memory device, a magnetic disk, or an optical disc and may be coupled to computing system 900 via the bus 935 or via a remote peripheral interface.

The computing system 900 may also be coupled, via the bus 935, to a display device 950 to display information to a user. The computing system 900 can also include an alphanumeric input device 960, including alphanumeric and other keys, which may be coupled to bus 935 to communicate information and command selections to processor(s) 910. Another type of user input device includes a cursor control 970 device, such as a touchpad, a mouse, a trackball, or cursor direction keys to communicate direction information and command selections to processor(s) 910 and to control cursor movement on the display device 950. The computing system 900 may also receive user input from a remote device that is communicatively coupled via one or more network interface(s) 980.

The computing system 900 further may include one or more network interface(s) 980 to provide access to a network, such as a local area network. The network interface(s) 980 may include, for example, a wireless network interface having antenna 985, which may represent one or more antenna(e). The computing system 900 can include multiple wireless network interfaces such as a combination of WiFi, Bluetooth®, near field communication (NFC), and/or cellular telephony interfaces. The network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment the network interface(s) 980 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 900 can further include one or more energy sources 905 and one or more energy measurement systems 945. Energy sources 905 can include an AC/DC adapter coupled to an external power source, one or more batteries, one or more charge storage devices, a USB charger, or other energy source. Energy measurement systems include at least one voltage or amperage measuring device that can measure energy consumed by the computing system 900 during a predetermined period of time. Additionally, one or more energy measurement systems can be included that measure, e.g., energy consumed by a display device, cooling subsystem, Wi-Fi subsystem, or other frequently used or high-energy consumption subsystem.

Figure 10:
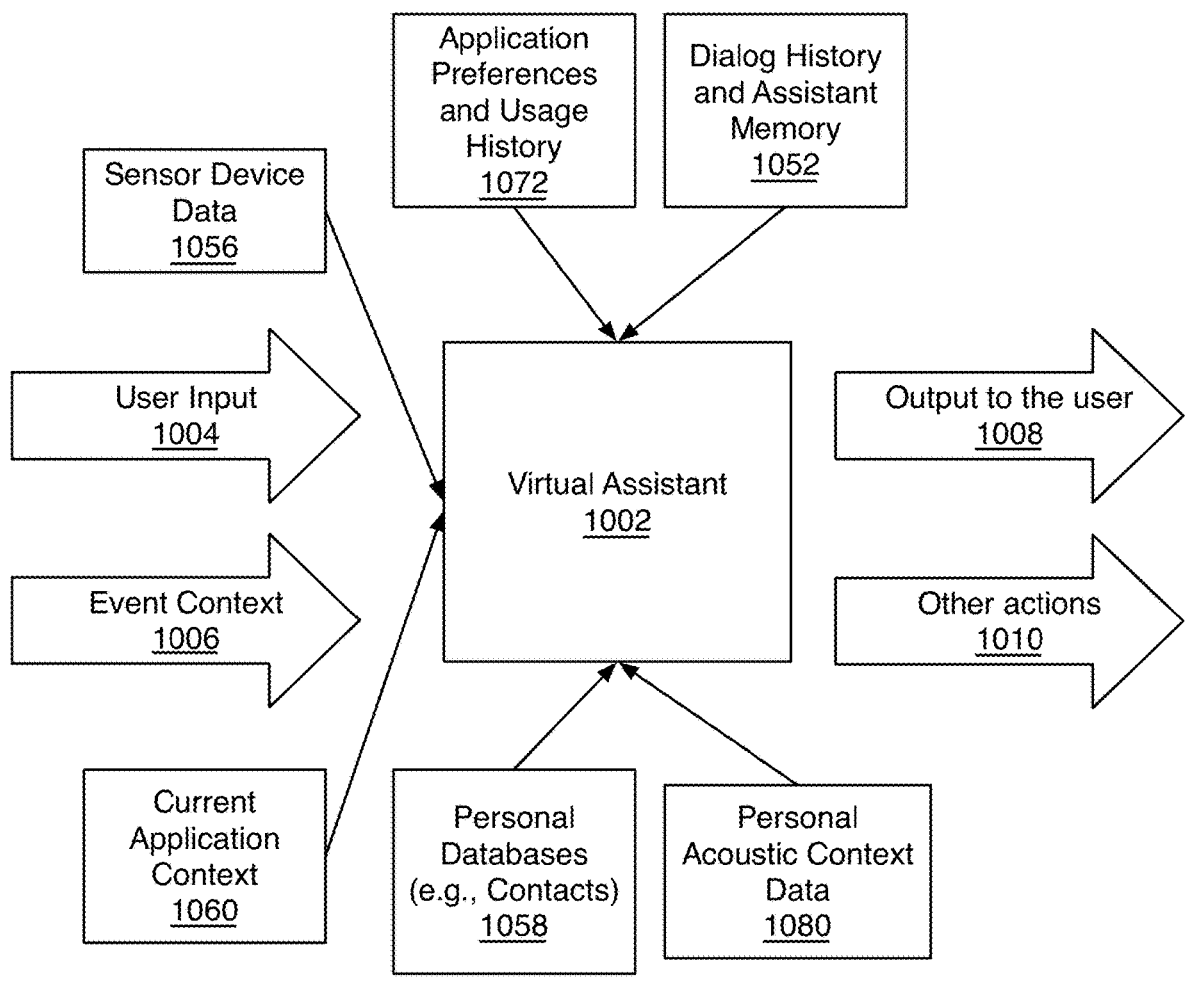
FIG. 10 is a block diagram of a virtual assistant, according to an embodiment.

FIG. 10 illustrates a block diagram of a virtual assistant system 1000, according to embodiments described herein. The illustrated virtual assistant system 1000 is exemplary of one embodiment and is not limiting as to all embodiments described herein. Virtual assistants employed by the various embodiment described herein may include additional, fewer and/or different components or features than those illustrated. The virtual assistant system 1000 includes a virtual assistant 1002 that can accept user input 1004, such as spoken or typed language, processes the input, and generate output 1008 to the user and/or perform 1010 actions on behalf of the user. The virtual assistant 1002 can use context information to supplement natural language or gestural input from a user. Context information can be used to clarify the intent of the user and to reduce the number of candidate interpretations of the user's input. The context information can also reduce the need for the user to provide excessive clarification input. Context can include any available information that is usable by the assistant to supplement explicit user input to constrain an information-processing problem and/or to personalize results. Context can be used to constrain solutions during various phases of processing, including, for example, speech recognition, natural language processing, task flow processing, and dialog generation.

The virtual assistant 1002 can draw on any of a number of different background sources of knowledge and data, such as dictionaries, domain models, and/or task models. From the perspective of the presently described embodiments, such background sources may be internal to the virtual assistant 1002 or can be gathered from one or more remote databases. In addition to user input 1004 and background sources, the virtual assistant 1002 can also draw on information from several sources of context, including, for example, device sensor data 1056, application preferences and usage history 1072, dialog history and assistant memory 1052, personal databases 1058, personal acoustic context data 1080, current application context 1060, and event context 1006.

In one embodiment, a physical device running the virtual assistant 1002, such as a user device, playback device, or smart media playback device as described herein, have one or more sensors devices. Such sensors can provide sources of contextual information in the form of device sensor data 1056. Examples of sensor information include, without limitation, the user's current location; the local time at the user's current location; the position, orientation, and motion of the device on which the user is interacting; the current light level, temperature and other environmental measures; the properties of the microphones and cameras in use; the current networks being used, and signatures of connected networks, including Ethernet, Wi-Fi and Bluetooth. Signatures include MAC addresses of network access points, IP addresses assigned, device identifiers such as Bluetooth names, frequency channels and other properties of wireless networks. Sensors can be of any type including for example: an accelerometer, compass, GPS unit, altitude detector, light sensor, thermometer, barometer, clock, network interface, battery test circuitry, and the like.

The current application context 1060 refers to the application state or similar software state that is relevant to the current activity of the user. For example, the user could be using a text messaging application to chat with a particular person. The Virtual assistant 1002 need not be specific to or part of the user interface of the text messaging application. Instead, the virtual assistant 1002 can receive context from any number of applications, with each application contributing its context to inform the virtual assistant 1002. If the user is currently using an application when the virtual assistant 1002 is invoked, the state of that application can provide useful context information. For example, if virtual assistant 1002 is invoked from within an email application, context information may include sender information, recipient information, date and/or time sent, subject, data extracted from email content, mailbox or folder name, and the like.

In one embodiment, information describing the user's application preferences and usage history 1072 includes preferences and settings for various applications, as well usage history associated with those applications. Application preferences and usage history 1072 is used as context for interpreting and/or operationalizing the user's intent or other functions of the virtual assistant 1002. Examples of such application preferences and usage history 1072 include, without limitation, shortcuts, favorites, bookmarks, friends lists, or any other collections of user data about people, companies, addresses, phone numbers, places, web sites, email messages, or any other references; recent calls made on the device; recent text message conversations, including the parties to the conversations; recent requests for maps or directions; recent web searches and URLs; stocks listed in a stock application; recent songs or video or other media played; the names of alarms set on alerting applications; the names of applications or other digital objects on the device; and the user's preferred language or the language in use at the user's location.

Another source of context data is the personal database 1058 of a user on a device such as a phone, such as for example an address book containing names and phone numbers. In one embodiment, personal information of the user obtained from personal databases 1058 are used as context for interpreting and/or operationalizing the user's intent or other functions of the virtual assistant 1002. For example, data in a user's contact database can be used to reduce ambiguity in interpreting a user's command when the user referred to someone by first name only. Examples of context information that can be obtained from personal databases 1058 include, without limitation, the user's contact database (address book)—including information about names, phone numbers, physical addresses, network addresses, account identifiers, important dates—about people, companies, organizations, places, web sites, and other entities that the user might refer to; the user's own names, preferred pronunciations, addresses, phone numbers, and the like; the user's named relationships, such as mother, father, sister, boss, and the like; the user's calendar data, including calendar events, names of special days, or any other named entries that the user might refer to; the user's reminders or task list, including lists of things to do, remember, or get that the user might refer to; names of songs, genres, playlists, and other data associated with the user's music library that the user might refer to; people, places, categories, tags, labels, or other symbolic names on photos or videos or other media in the user's media library; titles, authors, genres, or other symbolic names in books or other literature in the user's personal library.

Another source of context data is the user's dialog history with the virtual assistant 1002. Such history may include, for example, references to domains, people, places, and so forth. For example, a user can ask "What's the time in New York?". The virtual assistant 1002 can respond by providing the current time in New York City. The user can then ask "What's the weather?". The virtual assistant 1002 ca use the previous dialog history to infer that the location intended for the weather query is the last location mentioned in the dialog history.

Examples of context information from dialog history and virtual assistant memory include, without limitation, people mentioned in a dialog; places and locations mentioned in a dialog; current time frame in focus; current application domain in focus, such as email or calendar; current task in focus, such as reading an email or creating a calendar entry; current domain objects in focus, such as an email message that was just read or calendar entry that was just created; current state of a dialog or transactional flow, such as whether a question is being asked and what possible answers are expected; history of user requests; history of results of user requests, such as sets of restaurants returned; history of phrases used by the assistant in dialog; and facts that were told to the assistant by the user.

In one embodiment, personal acoustic context data 1080 be used to select from possible statistical language models that may be used to understand user speech, or otherwise tune the speech recognition to optimize for recognized acoustical contexts. When interpreting speech input, the virtual assistant 1002 can tune a speech to text service to take into account the acoustic environments in which the speech is entered. For example, the noise profiles of a quiet office are different from those of automobiles or public places. If a speech recognition system can identify and store acoustic profile data, these data can also be provided as contextual information. When combined with other contextual information such as the properties of the microphones in use, the current location, and the current dialog state, acoustic context can aid in recognition and interpretation of input.

In the foregoing specification, the invention has been described regarding specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

Embodiments described herein provide a media playback system that enables a smooth transition between incoming audio events, such as pre-set alarms, and currently playing media. One embodiment provides for a media playback device comprising a memory device to store instructions, one or more processors to execute the instructions stored on the memory device, the instructions to cause the one or more processors to provide a playback queue manager to manage one or more media playback queues including a set of media items associated with a scheduled event; and a playback routing manager to determine an output destination for the media items based on context associated with the scheduled event.

In one embodiment the playback queue manager is configured to manage multiple simultaneous playback queues, the multiple simultaneous playback queues including one or more past, present or future media elements to be played. The playback manager can route output of playback of the set of media items to one or more of multiple different connected media playback devices based on the context associated with the scheduled event. In one embodiment the playback routing manager additionally configurable to route the set of media items to one or more of multiple different connected media playback devices for playback, the playback routing manager to route the set of media items based on the context associated with the scheduled event. The context associated with the scheduled event can include a user account associated with the scheduled event and can additionally include a location associated with the media playback device. In one embodiment, the location associated with the media playback device includes a room or a location within the room.

In one embodiment, the set of media items includes an audio alarm. When the scheduled event is an alarm event the playback routing manager can to route the audio alarm to one or more of multiple different media playback devices based on the context associated with the alarm event. In one embodiment, the context associated with the scheduled event includes a label associated with the scheduled event. The output destination for the set of media items can speak the label associated with the scheduled event or display the label associated with the scheduled event.

One embodiment provides for a non-transitory machine readable medium storing instructions which, when executed by one or more processors of an electronic device, cause the one or more processors to perform operations including receiving a request to play a queue of media item associated with a scheduled event; determining whether an existing playback queue is in effect on the electronic device; determining whether the queue of media items associated with the scheduled event is a transient queue; storing the existing playback queue as a secondary media queue in response to determining that the existing playback queue is in effect and that the queue of media items associated with the scheduled event is a transient queue; and playing the queue of media items associated with the scheduled event until the scheduled event is dismissed.

In one embodiment, the operations additionally include determining whether a playback queue is in effect within a zone associated with the electronic device and loading the queue of media items into the playback queue in response to determining that the playback queue is not currently effect within the zone. In one embodiment the instructions to cause additional operations including determining that an existing playback queue is in effect within the zone associated with the electronic device; temporarily detaching the electronic device from the zone; loading the queue of media items into the playback queue of the electronic device; initiating playback of the queue of media items on the electronic device; and restoring the electronic device to the zone after playback of the queue of media items.

One embodiment provides for a data processing system comprising a memory device to store instructions; one or more processors to execute the instructions stored on the memory device, the instructions to cause the one or more processors to provide a virtual assistant to receive voice input at a media playback device associated with the data processing system, the virtual assistant, via the one or more processors, to receive a voice command at the media playback device, the voice command to schedule an event; determine a user account associated with the voice command; determine a type of command based on context information associated with the voice command; and determine a target device to which media playback associated with the event is to be scheduled.

In one embodiment the virtual assistant, via the one or more processors, can output a verbal request for confirmation of a determined type of command and target device. The virtual assistant, via the one or more processors, can also determine an alternate type of command or target device based on a correction received in response to the verbal request for confirmation. Furthermore, the virtual assistant can schedule the event and associated media playback to the target device.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A data processing system comprising:
   a memory device to store instructions;
   one or more processors to execute the instructions stored on the memory device, the instructions to cause the one or more processors to provide a virtual assistant to receive voice input at a media playback device associated with the data processing system, the virtual assistant, via the one or more processors, to:
   receive a voice command at the media playback device, the voice command to schedule an event;
   determine context information associated with the voice command, the context information including a user account associated with the voice command, wherein the user account is a user account in a family of related user accounts and the user account is associated with the media playback device;
   determine a type of command based on context information associated with the voice command;
   determine a target device to which media playback associated with the event is to be scheduled; and
   schedule the event to a determined target device based on a determined type of command.

2. The data processing system as in claim 1, the virtual assistant, via the one or more processors, to output a verbal request for confirmation of the type of command and target device determined by the virtual assistant.

3. The data processing system as in claim 2, the virtual assistant, via the one or more processors, to determine an alternate type of command or alternate target device based on a correction received in response to the verbal request for confirmation.

4. The data processing system as in claim 3, wherein to schedule the event to the determined target device based on the determined type of command includes to schedule the event to the alternate target device based on the alternate type of command.

5. The data processing system as in claim 1, wherein the context information associated with the voice command includes a location associated with the media playback device.

6. The data processing system as in claim 5, wherein the location associated with the media playback device includes a room associated with the media playback device.

7. The data processing system as in claim 6, wherein the location associated with the media playback device additionally includes a location within the room.

8. A non-transitory machine readable medium storing instructions which, when executed by one or more processors of a data processing system, cause the data processing system to perform operations comprising:
receiving a voice command to schedule an event, the voice command received by a virtual assistant at a media playback device associated with the data processing system;
determining context information associated with the voice command, the context information including a user account associated with the voice command, wherein the user account is a user account in a family of related user accounts and the user account is associated with the media playback device;
determining a type of command based on context information associated with the voice command;
determining a target device to which media playback associated with the event is to be scheduled; and
scheduling the event to the determined target device based on a determined type of command.

9. The non-transitory machine readable medium as in claim 8, the operations further comprising outputting, via the virtual assistant, a verbal request for confirmation of the type of command and the target device determined by the virtual assistant.

10. The non-transitory machine readable medium as in claim 9, the operations further comprising determining, via the virtual assistant, an alternate type of command or alternate target device based on a correction received in response to the verbal request for confirmation.

11. The non-transitory machine readable medium as in claim 10, wherein to schedule the event to the determined target device based on the determined type of command includes to schedule the event to the alternate target device based on the alternate type of command.

12. The non-transitory machine readable medium as in claim 8, wherein the context information associated with the voice command includes a location associated with the media playback device.

13. The non-transitory machine readable medium as in claim 12, wherein the location associated with the media playback device includes a room associated with the media playback device.

14. The non-transitory machine readable medium as in claim 13, wherein the location associated with the media playback device additionally includes a location within the room.

15. A media playback device comprising:
a memory device to store instructions;
one or more processors to execute the instructions stored on the memory device, the instructions to cause the one or more processors to provide:
a virtual assistant to receive voice input at the media playback device, the virtual assistant, via the one or more processors, to:
receive a voice command at the media playback device, the voice command to schedule an event;
determine context information associated with the voice command, the context information including a user account associated with the voice command, wherein the user account is a user account in a family of related user accounts and the user account is associated with the media playback device;
determine a type of command based on context information associated with the voice command;
determine a target device to which media playback associated with the event is to be scheduled; and
schedule the event to a determined target device based on a determined type of command.

16. The media playback device as in claim 15, the virtual assistant, via the one or more processors, to output a verbal request for confirmation of the type of command and target device determined by the virtual assistant.

17. The media playback device as in claim 16, the virtual assistant, via the one or more processors, to determine an alternate type of command or alternate target device based on a correction received in response to the verbal request for confirmation.

18. The media playback device as in claim 17, wherein to schedule the event to the determined target device based on the determined type of command includes to schedule the event to the alternate target device based on the alternate type of command.

19. The media playback device as in claim 15, wherein the context information associated with the voice command includes a location associated with the media playback device.

20. The media playback device as in claim 19, wherein the location associated with the media playback device includes a room associated with the media playback device or a location within the room associated with the media playback device.

* * * * *